US011920081B2

(12) United States Patent
Purdy et al.

(10) Patent No.: US 11,920,081 B2
(45) Date of Patent: Mar. 5, 2024

(54) MODIFIED ACID COMPOSITIONS AS ALTERNATIVES TO CONVENTIONAL ACIDS IN THE OIL AND GAS INDUSTRY

(71) Applicant: Fluid Energy Group Ltd., Calgary (CA)

(72) Inventors: Clay Purdy, Medicine Hat (CA); Markus Weissenberger, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 82 days.

(21) Appl. No.: 17/190,690

(22) Filed: Mar. 3, 2021

(65) Prior Publication Data

US 2021/0207017 A1    Jul. 8, 2021

Related U.S. Application Data

(60) Division of application No. 16/691,815, filed on Nov. 22, 2019, which is a continuation of application No. (Continued)

(30) Foreign Application Priority Data

Jun. 2, 2017  (CA) ........................... 2969174

(51) Int. Cl.
*C09K 8/52* (2006.01)
*A23C 21/00* (2006.01)
(Continued)

(52) U.S. Cl.
CPC ............... *C09K 8/52* (2013.01); *A23C 21/00* (2013.01); *A23J 1/00* (2013.01); *A23J 1/202* (2013.01);
(Continued)

(58) Field of Classification Search
CPC .. C11D 3/30; C09K 17/42; C09K 8/72; C23F 11/04; A23J 1/202; A61M 1/1006;
(Continued)

(56) References Cited

U.S. PATENT DOCUMENTS 4,140,647 A * 2/1979 Mizutani ................ C11D 3/044
134/40
5,006,258 A    4/1991 Veatch et al.
(Continued)

FOREIGN PATENT DOCUMENTS

WO    9421865 A1    9/1994
WO    2016178660 A1    11/2016

OTHER PUBLICATIONS

Office Action dated Dec. 10, 2018 in CA Application No. 3,006,476, 5 pages.
(Continued)

*Primary Examiner* — Walter D. Griffin
*Assistant Examiner* — Cameron J Allen
(74) *Attorney, Agent, or Firm* — Berg Hill Greenleaf Ruscitti LLP

(57) ABSTRACT

An aqueous modified acid composition for industrial activities, said composition comprising: an alkanolamine and strong acid in a molar ratio of not less than 1:15, preferably not less than 1:10; it can also further comprise a metal iodide or iodate. Said composition demonstrates advantages over known conventional acids and modified acids.

20 Claims, 9 Drawing Sheets

(9 of 9 Drawing Sheet(s) Filed in Color)

Spend rate over time

Left y-axis - % spent of the acidic composition
Right y-axis - the temperature in degrees centigrade
x-axis – time in minutes

Related U.S. Application Data

15/992,951, filed on May 30, 2018, now Pat. No. 10,822,535.

(51) Int. Cl.

| | |
|---|---|
| A23J 1/00 | (2006.01) |
| A23J 1/20 | (2006.01) |
| B01D 15/20 | (2006.01) |
| B01J 49/50 | (2017.01) |
| B01J 49/60 | (2017.01) |
| B08B 3/08 | (2006.01) |
| B09C 1/08 | (2006.01) |
| C02F 1/50 | (2023.01) |
| C02F 1/66 | (2023.01) |
| C04B 41/00 | (2006.01) |
| C04B 41/53 | (2006.01) |
| C04B 41/72 | (2006.01) |
| C05B 11/04 | (2006.01) |
| C05B 15/00 | (2006.01) |
| C05B 17/00 | (2006.01) |
| C05C 11/00 | (2006.01) |
| C05D 9/00 | (2006.01) |
| C05G 3/80 | (2020.01) |
| C05G 5/23 | (2020.01) |
| C09K 8/54 | (2006.01) |
| C09K 8/72 | (2006.01) |
| C09K 13/06 | (2006.01) |
| C09K 17/40 | (2006.01) |
| C09K 17/42 | (2006.01) |
| C09K 17/48 | (2006.01) |
| C11D 3/30 | (2006.01) |
| C11D 7/08 | (2006.01) |
| C11D 7/32 | (2006.01) |
| C23F 11/04 | (2006.01) |
| C23F 11/14 | (2006.01) |
| E21B 37/06 | (2006.01) |
| C02F 5/12 | (2023.01) |

(52) U.S. Cl.
CPC ............ *B01D 15/203* (2013.01); *B01J 49/50* (2017.01); *B01J 49/60* (2017.01); *B08B 3/08* (2013.01); *B09C 1/08* (2013.01); *C02F 1/50* (2013.01); *C02F 1/66* (2013.01); *C04B 41/009* (2013.01); *C04B 41/5315* (2013.01); *C04B 41/5353* (2013.01); *C04B 41/72* (2013.01); *C05B 11/04* (2013.01); *C05B 15/00* (2013.01); *C05B 17/00* (2013.01); *C05C 11/00* (2013.01); *C05D 9/00* (2013.01); *C05G 3/80* (2020.02); *C05G 5/23* (2020.02); *C09K 8/54* (2013.01); *C09K 8/72* (2013.01); *C09K 13/06* (2013.01); *C09K 17/40* (2013.01); *C09K 17/42* (2013.01); *C09K 17/48* (2013.01); *C11D 3/30* (2013.01); *C11D 7/08* (2013.01); *C11D 7/3218* (2013.01); *C23F 11/04* (2013.01); *C23F 11/142* (2013.01); *E21B 37/06* (2013.01); *C02F 5/125* (2013.01); *C09K 2208/32* (2013.01)

(58) Field of Classification Search
CPC ............ A61M 1/1678; A61M 1/3482; A61M 1/1654; A61M 1/1696; A61M 1/1605; A61M 1/3472; A61M 1/28; A61M 2205/3331; A61M 1/165; A61M 1/3639; A61M 1/12; A61M 1/1649; A61M 2209/088; B01D 61/44; B01D 61/145; B01D 61/28; B01D 61/485; B01D 61/022; B01D 61/445; B01D 61/12; B01D 61/246; B01D 61/48; B01D 61/32; B01D 61/54; B01D 61/50; B01D 61/58; B01D 2311/2684; B01D 2317/02; B01D 2311/243; B01D 2325/42; B01D 2313/40; C02F 9/00; C02F 1/441; C02F 1/442; C02F 1/444; C02F 1/4695; A61N 1/00
See application file for complete search history.

(56) References Cited

U.S. PATENT DOCUMENTS

| | | | |
|---|---|---|---|
| 2005/0130866 A1* | 6/2005 | Richardson | C22B 15/0056 510/446 |
| 2008/0119374 A1* | 5/2008 | Willberg | C09K 8/72 507/209 |
| 2016/0032176 A1 | 2/2016 | Jiang et al. | |
| 2016/0130496 A1 | 5/2016 | Holtsclaw et al. | |

OTHER PUBLICATIONS

Office Action dated Mar. 4, 2019 in CA Application No. 3,006,476, 4 pages.

* cited by examiner

Left y-axis - % spent of the acidic composition

Right y-axis - the temperature in degrees centigrade x-axis – time in minutes

Left y-axis - % spent of the acidic composition

Right y-axis - the temperature in degrees centigrade x-axis – time in minutes

MODIFIED ACID COMPOSITIONS AS ALTERNATIVES TO CONVENTIONAL ACIDS IN THE OIL AND GAS INDUSTRY

CROSS REFERENCE TO RELATED APPLICATIONS

This application is a divisional of U.S. application Ser. No. 16/691,815, filed Nov. 22, 2019; which is a continuation of U.S. application Ser. No. 15/992,951, filed May 30, 2019; which claims priority to Canadian Patent Application No. 2,969,174, filed Jun. 2, 2017, the entireties of these related applications being incorporated herein by reference.

FIELD OF THE INVENTION

This invention relates to compositions for use in performing various applications in various industries including but not limited to the oil & gas industry, more specifically it relates to the use of alkanolamines to create an aqueous modified acid composition as an alternative to conventional mineral and organic acids for use over a broad range of temperatures and applications.

BACKGROUND OF THE INVENTION

In the oil & gas industry, stimulation with an acid is performed on a well to initiate, increase or restore production. In some instances, a well initially exhibits low permeability, and stimulation is employed to commence production from the reservoir. In other instances, stimulation or remediation is used to further encourage permeability and flow from an already existing well that has become underproductive due to scaling issues, wellbore damage or reservoir depletion.

Acidizing is a type of stimulation treatment which is performed above or below the reservoir fracture pressure in an effort to initiate, restore or increase the natural permeability of the reservoir. Acidizing is achieved by pumping acid, predominantly hydrochloric acid, into the well to dissolve typically limestone, dolomite and calcite cement between the acid insoluble sediment grains of the reservoir rocks or to treat scale accumulation.

There are three major types of acid applications: matrix acidizing, fracture acidizing, and breakdown or spearhead acidizing (pumped prior to a non-acid fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the formation fracture pressure. In this form of stimulation, the acids dissolve the sediments formation and/or mud solids that are inhibiting the permeability of the rock, enlarging the natural pores of the reservoir (wormholing) and stimulating the flow of hydrocarbons to the wellbore for recovery. While matrix acidizing is done at a low enough pressure to keep from fracturing the reservoir rock, fracture acidizing involves pumping acid into the well at a very high pressure, physically fracturing the reservoir rock and etching the acid reactive portion of the formation. This type of acid treatment forms channels or acid etched fractures through which the hydrocarbons can flow, in addition to forming a series of wormholes. In some instances, a proppant is introduced into the fluid which assists in propping open the fractures, further enhancing the flow of hydrocarbons into the wellbore.

The most common type of acid employed on wells to stimulate production or undertake remedial work is hydrochloric acid (HCl), which is useful in stimulating carbonate reservoirs.

Some of the major challenges faced in the oil & gas industry from using hydrochloric acid include the following: extremely high levels of corrosion (which is countered by the addition of 'filming' type corrosion inhibitors that are typically themselves toxic and harmful to humans, wildlife, the environment and equipment). Reactions between mineral acids and various types of metals can vary greatly but softer metals, such as aluminum and magnesium, are very susceptible to major effects causing immediate damage. Hydrochloric acid produces hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes.

The inherent environmental effects (organic sterility, poisoning of wildlife etc.) of acids in the event of an unintended or accidental release on surface or downhole into water aquifers or other sources of water are devastating and can cause significant pH reduction of such and can substantially increase the toxicity and could potentially cause a mass culling of aquatic species and potential poisoning of humans or livestock and wildlife exposed to/or drinking the water. An unintended release at surface can also cause hydrogen chloride gas to be released, potentially endangering human and animal health. This is a common event at large storage sites when tanks split or leak or during traffic accidents with trucks handling HCl. Typically, if near the public, large areas need to be evacuated post event and a comprehensive, expensive to implement, emergency evacuation plan needs to be in place prior to approval of such storage areas. Because of its acidic nature, hydrogen chloride gas is also corrosive, particularly in the presence of moisture.

The inability for mineral acids with common corrosion control additives and blends of such to biodegrade naturally results in expensive cleanup-reclamation costs for the operator should an unintended release occur. Moreover, the toxic fumes produced by mineral & some organic acids are harmful to humans/animals and are highly corrosive and/or produce potentially explosive, toxic and/or corrosive vapours. Transportation and storage requirements for acids are restrictive and taxing. As well, the dangers surrounding exposure by personnel handling the blending of such dangerous products constrict their use/implementation in areas of high risk such as within city limits and environmentally sensitive areas such as offshore Another concern is the potential for exposure incidents on locations due to high corrosion levels, even at ambient temperatures, of acids causing potential storage tank failures and/or deployment equipment failures i.e. coiled tubing or high pressure iron failures caused by high corrosion high rates (pitting, cracks, pinholes and major failures). Other concerns include: downhole equipment failures from corrosion causing the operator to have to execute a work-over and replace down hole pumps, tubulars, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Typically, acids are produced in industrial areas of countries located some distance from oil & gas producing areas, up to and sometimes over 10 additives can also be required to control various aspects of the acids properties adding to complications in the handling and shipping logistics. Having an alternative that requires minimal additives is very advantageous.

Extremely high corrosion and reaction rates with temperature increase causes conventional mineral acids to spend/react or "neutralize" prior to achieving the desired effect such as deeply penetrating an oil or gas formation to increase the wormhole or etched "pathway" effectively to allow the petroleum product to flow freely to the wellbore. As another example, hydrochloric acid can be utilized in an attempt to free stuck drill pipe in some situations. Prior to getting to the required depth to dissolve the formation that has caused the pipe/tubing to become stuck many acids spend or neutralize on formation closer to the surface due to increased bottom hole temperatures and greatly increased reaction rate, so it is advantageous to have an alternative that spends or reacts more methodically allowing the slough to be treated with a solution that is still active, allowing the pipe/tubing to be pulled free.

When used to treat scaling issues on surface equipment due to produced or injected water mineral precipitation, conventional acids are exposed to human and mechanical devices as well as expensive equipment causing increased risk and cost for the operator in the event of corrosion related issues. When mixed with bases or higher pH fluids or even water, strong acids will create a large amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with sea or produced water thereby increasing costs associated with transportation.

Conventional mineral acids used in a pH control situation can cause rapid degradation of certain polymers/additives requiring increased loadings or chemicals to be added to counter these negative effects. Many offshore areas of operations have very strict regulatory rules regarding the transportation/handling and deployment of acids causing increased liability and costs for the operator. When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel or sheering out in high rate applications) causing the acids to become very corrosive and resulting in damage to downhole equipment/tubulars. Conventional acids can be harmful to many elastomers and/or seals found in the oil & gas industry such as those found in blow out preventers (BOP's)/downhole tools/packers/submersible pumps/seals etc. Having to deal with spent acid during the back-flush process is also very expensive as these acids typically are still at a low pH and remain toxic and corrosive. It is advantageous to have an acid blend that can be exported to production facilities through pipelines that, once spent or applied, is much higher than that of spent HCl, reducing disposal costs/fees. Also, mineral acids will typically precipitate iron and/or minerals solubilized during the operation as the pH of the spent acid increases causing facility upsets and lost production. It is advantageous to have a strong acid that will hold these solubilized minerals and metals in solution even as pH rises dramatically close to or above a neutral state, greatly reducing the need to dispose of spent acids and allowing them to be processed and treated in a more economical manner. Acids are used in the performance of many operations in the oil & gas industry and are considered necessary to achieve the desired production of various petroleum wells and associated equipment, maintain their respective systems and aid in certain drilling, remedial and completion operational functions (i.e. freeing stuck pipe, filter cake treatments, stimulation and scale treatments). The associated dangers that come with using mineral acids are expansive and it is thus desirable to mitigate them through controls whether they are chemically or mechanically engineered.

Eliminating or even simply reducing the negative effects of strong acids while maintaining their usefulness is a struggle and risk for the industry. As the public and government demand for the use of less hazardous products increases, companies are looking for alternatives that perform the required function without all or most of the drawbacks associated with the use of conventional acids.

While some modified acids have overcome some problems emanating from the use of strong acids, their reactivity becomes a concern for the user who, in some cases, would need a fast acting acid such as a conventional mineral acid like 15% HCl, commonly utilized as a spearhead treatment acid. The careful balancing of increased safety (i.e. less fuming or vapor pressure less corrosive to metal and dermal tissue, transport issues) while retaining a quick reaction time is a challenge for operators.

There are a range of hydraulic fracturing techniques and several different approaches may be applied within a specific area. Hydraulic fracturing programs and the fracture fluid composition vary based on the engineering requirements specific to the formation, wellbore mineralogy, porosity and permeability and location. However, water-based fracking techniques typically requires the following four steps: the spearhead or breakdown acid step; the pad step; the proppant step; and the flush step. In the spearhead step, which is commonly referred to as an acid spearhead step, operators typically use 10% to 15% hydrochloric acid, most preferred being 15% hydrochloric acid due to the highly reactive nature of the acid reducing the time required to initiate the preferred feed rate. A spearhead acid's purpose is to clear debris that is present in the wellbore perforations and assists in initiating the next stage of the fracture treatment at lower pressures providing a clear pathway for fracture fluids to access the formation. In the second step, the pad step, fluid is injected into the wellbore to break or fracture the formation and initiate the hydraulic fracturing of the target formation. No proppant is used during this step. In the third step, the proppant step, a mixture of water and proppant (most commonly natural sand or high strength synthetic proppant) is injected into the wellbore. The proppant is carried by the gelled or viscous fluid (also referred to as fracking fluid) into the formation and deposited. The proppant remains in the formation to maintain the fractures open while the pressure is reduced and fluid and excess proppant is removed from the formation. The proppant remaining in formation allows the formation to maintain its new increased permeability. Lastly, the flush step involves the injection of a large volume of fresh water to be pumped down the wellbore to flush out the leftover excess proppant which could still be residing within the wellbore.

Several operations in the oil industry expose fluids to very high temperatures (some up to and over 190° C.), the compositions used in these various operations need to withstand high temperatures without losing their overall effectiveness. These compositions must also be capable of being applied in operations over a wide range of temperatures while not or at least minimally affecting or corroding the equipment with which it comes in contact in comparison to a conventional mineral acid of which the corrosion effect at ultra-high temperatures is very difficult and expensive to control.

Many countries bordering the waters where offshore drilling and production is routinely carried out have put into play a number of regulations and operational parameters aimed at minimizing the environmental and human exposure impact. These regulations/procedures include the ban and/or regulation of certain chemicals which may be harmful to marine life and/or the environment. In order to overcome these very restrictive regulations, many oil companies employ very costly containment programs for the handling of certain chemicals, such as acids, which have a wide array of uses in the industry of oil and gas exploration and production.

Acids conventionally used in various oil and gas operations can be exposed to temperatures of up to and over 190° C. At these temperatures, their reactivity and corrosive properties is exponentially increased and as such their economical effectiveness is greatly decreased. Corrosion is one of the major concerns at high temperatures and is difficult and expensive to control with additional chemistry, if it can be controlled at all. In some situations, a mechanical procedure must be utilized as opposed to a chemical solution due to temperature constraints or very expensive, exotic acid systems not widely available in the marketplace.

Modified and synthetic acids developed and currently patented such as those containing main components of urea and hydrochloric acid are aimed at increasing personnel safety, reducing corrosion effects, slowing down the reaction rate and reducing the toxicity of HCl. However, it has been found that at temperatures above 90-100° C. the urea component in a synthetic or modified acid containing such compound tends to ultimately decompose and produce ammonia and carbon dioxide as a by-product of decomposition. The ammonia component will neutralize the acidic component of the HCl and render the product non-reactive or neutral. Additionally, there is the risk of wellbore and/or formation damage due to uncontrolled, previously solubilized mineral precipitation due to the increase in pH caused predominantly by the formation of ammonia during the decomposition phase.

US 20160032176 A1 discloses methods for treating subterranean wells in which the producing formation is a carbonate comprise preparing a treatment fluid comprising either: (a) an aqueous solution of a multivalent-cation reacting polymer; (b) a solution comprising a fatty acid and an ethanolamine; (c) an aqueous acidic solution of one or more compounds whose calcium salts are insoluble; or (d) an aqueous solution comprising urea or alkane derivatives thereof or both and polyvinylpyrrolidone (PVP). It states that the treatment fluid is placed in the well such that the solution contacts the carbonate formation at a pressure lower than the fracturing pressure. It further states that the treatment fluid is allowed to react with the carbonate formation, thereby depositing a film onto the formation surface or part of the formation surface. Then an acid solution is placed in the well such that the acid contacts the carbonate formation at a pressure lower than the fracturing pressure.

Despite the prior art and in light of the substantial challenges elicited by the use of acids in oil and gas operations at high temperatures, there still exists a critical need to find an alternative to known synthetic or complexed/modified acids which will remain stable above temperatures of 90-100° C. while still providing the safety and lower corrosion effects of a modified acid and having a performance comparable to that of a conventional acid such as HCl. The inventors have surprisingly and unexpectedly found that by combining an alkanolamine with hydrochloric acid in appropriate ratios one can obtain both a safer alternative to this popular conventional mineral acid (HCl), all the while substantially maintaining the performance properties of the acid thereby remaining useful in oil and gas operations and being competitively priced and widely available.

Consequently, there is still a need for safer, more technically advanced strong acid compositions for use in various oil industry applications and temperatures and which can decrease/minimize or eliminate a number of the associated dangers and/or operational issues, such as high corrosion rates and/or safety but not necessarily limited thereto.

It was discovered that the compositions according to the present invention exhibit stability for operations at elevated temperature (above 90° C. and up to 190° C.) and therefore makes them useful in the oil and gas industry for all applications where an acid is required and provides operators the ability to treat high temperature completions and maintenance/production operations with a technology that provides a level of safety, technical advantages and low corrosion the combination of which is rare or unknown in the industry until now. The composition according to the present invention can ideally be used in oilfield operations, including but not limited to: spearhead breakdown acid, acid fracturing operations, injection-disposal well treatments, high temperature cyclical steam injection (CSS) scale treatments, steam assisted gravity drainage (SAGD) scale treatments, surface and subsurface equipment and pipelines & facilities scale treatments, filter cake treatments, tubing or metal pickling, matrix acidizing operations, stimulations, fracturing, soaks, cement squeezes, fluid pH control, stuck pipe operations, and coiled tubing acid washes, soaks and squeezes. The most preferred use of a composition according to the present invention is for spearhead acid, remedial work and high temperature cyclical steam and SAGD scale treatments.

SUMMARY OF THE INVENTION

Compositions according to the present invention have been developed for the oil & gas industry and its associated applications, by targeting the problems of corrosion, logistics & handling, human & environmental exposure, reaction rates, toxicity levels, biodegradation tendencies and formation/fluid compatibilities and facility and/or production and water treatment infrastructure operational compatibilities.

It is an object of the present invention to provide a modified acid composition which can be used over a broad range of applications in the oil and gas industry and which exhibit advantageous properties over known compositions. According to an aspect of the present invention, there is provided a modified acid composition comprising: a strong acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 4.1:1; and yet even more preferably in a molar ratio of not more than 3:1. According to another aspect of the present invention, there is provided a modified acid composition comprising: a strong acid and an alkanolamine in a molar ratio ranging from 3:1 to 15:1, preferably from 3:1 to 10:1; more preferably from 4:1 to 8:1, also preferably from 5:1 to 6.5:1.

Preferred embodiments of the present invention provide a modified acid composition which, upon proper use, results in a very low corrosion rate on oil and gas industry tubulars down-hole tools and equipment.

According to a preferred of the present invention, there is provided a modified acid composition for use in the oil industry which is biodegradable. According to a preferred of the present invention, there is provided a modified acid composition for use in the oil industry which will provide a thermal stability at temperatures above 90° C. and up to 190° C.

According to a preferred embodiment of the present invention, there is provided an aqueous modified acid composition for use in the oil industry which affords corrosion protection at an acceptable oilfield limit at temperatures ranging up to 190° C.

According to a preferred embodiment of the present invention, there is provided an aqueous modified acid composition for use in the oil industry which has minimal exothermic reactivity upon dilution or during the dilution process with water.

According to a preferred embodiment of the present invention, there is provided an aqueous modified acid composition for use in the oil industry which is compatible with existing industry acid additives.

According to a preferred embodiment of the present invention, there is provided an aqueous modified acid composition for use in oil industry operations which is immediately reactive upon contact/application with calcium-based sale or formations.

According to a preferred of the present invention, there is provided an aqueous modified acid composition for use in the oil industry which results in less unintended near wellbore erosion or face dissolution due to a more controlled hydrogen proton donation. This, in turn, results in deeper, more optimal formation penetration and worm-holing properties, increased permeability, and reduces the potential for zonal communication during a typical 'open hole' mechanical isolation application treatment. When a highly reactive acid, such as hydrochloric acid, is deployed into a well that has open hole packers for isolation (without casing) there is a potential to cause a loss of near-wellbore compressive strength resulting in communication between zones or sections of interest as well as potential sand production, and fines migration. In addition, conventional mineral acids commonly deployed such as hydrochloric acid can cause wellbore stability issues, due to their highly reactive nature, resulting in the potential for compressive forces to be greatly increased thereby causing potential expensive remedial work due to collapsed or compressed production tubulars. It is advantageous to have a modified acid with an increased activation energy barrier or more controlled proton diffusion coefficient.

Accordingly, a preferred embodiment of the present invention would overcome at least several of the drawbacks found in the use of conventional acid compositions of the prior art related to the oil & gas industry.

According to another aspect of the present invention, the modified acid composition can also be used in the mining industry for the uses selected from the group consisting of: treating scale and adjusting pH levels in fluid systems. According to yet another aspect of the present invention, the modified acid composition can also be used in the water treatment industry said use being selected from the group consisting of: adjusting pH and neutralizing alkaline effluent. According to yet another aspect of the present invention, the modified acid composition can also be used in the fertilizer/landscaping industry to adjust the pH level of a soil. According to yet another aspect of the present invention, the modified acid composition can also be used to regenerate ion exchange beds. According to yet another aspect of the present invention, the modified acid composition can also be used in the construction industry said use being selected from the group consisting of: etching concrete and cleaning concrete from equipment and buildings. According to yet another aspect of the present invention, the modified acid composition can also be used in the electrical generation industry, said use being selected from the group consisting of: descaling pipelines and related equipment and descaling facilities. According to yet another aspect of the present invention, the modified acid composition can also be used in the food and dairy industry, said use being selected from the group consisting of: manufacturing protein, manufacturing starch, demineralizing whey, manufacturing casein and regenerating ion exchange resins. According to yet another aspect of the present invention, the modified acid composition can also be used in the in the pool industry to lower the pH of fluids. According to yet another aspect of the present invention, the modified acid composition can also be used in the manufacturing industry to perform an operation selected from the group consisting of: pickling steel and cleaning metal. According to yet another aspect of the present invention, the modified acid composition can also be used in the retail industry as a low pH cleaning additive.

BRIEF DESCRIPTION OF THE FIGURES

The patent or application file contains at least one drawing executed in color. Copies of this patent or patent application publication with color drawings will be provided by the Office upon request and payment of the necessary fee.

The invention may be more completely understood in consideration of the following description of various embodiments of the invention in connection with the accompanying figure, in which.

DETAILED DESCRIPTION OF THE PREFERRED EMBODIMENTS

Figure 1:
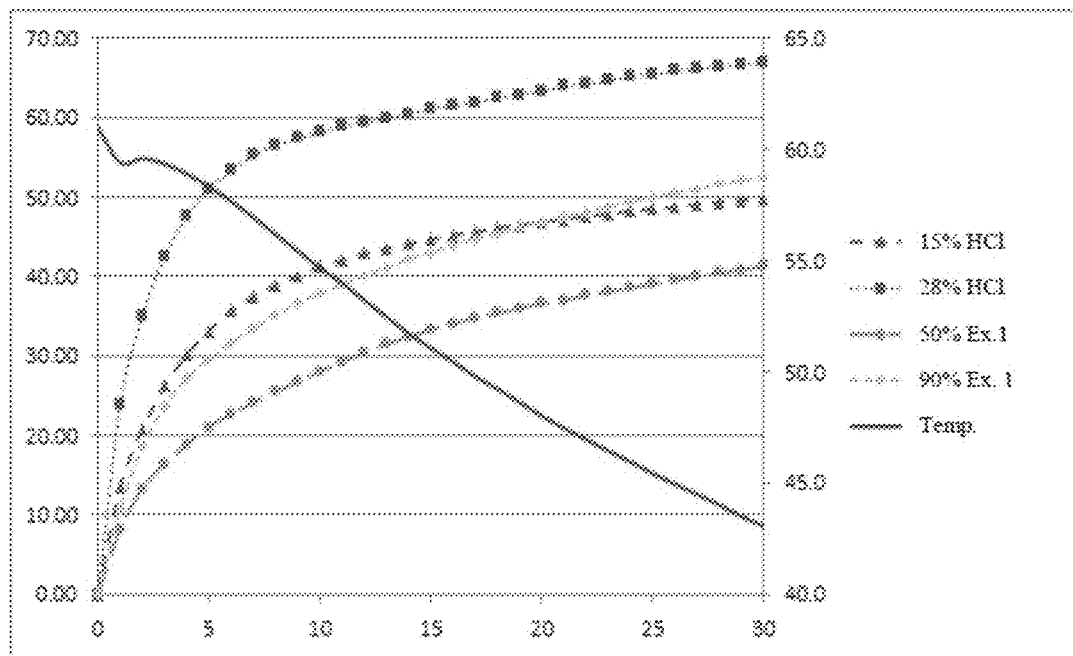
FIG. 1 is a graphical representation of the spend rate of various concentrations of a preferred embodiment according to the present invention versus two concentrations of a control composition.

The description that follows, and the embodiments described therein, is provided by way of illustration of an example, or examples, of particular embodiments of the principles of the present invention. These examples are provided for the purposes of explanation, and not limitation, of those principles and of the invention.

According to an aspect of the present invention, there is provided a synthetic or modified acid composition comprising:

a strong acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 4.1:1; and yet even more preferably in a molar ratio of not less than 3:1.

Preferably, the main components in terms of volume and weight percent of the composition of the present invention comprise an alkanolamine and a strong acid, such as HCl, nitric acid, phosphoric acid, sulfuric acid, sulfonic acid. An alkanolamine according to the present invention contains at least one amino group, —$NH_2$, and one alcohol group, —OH. Preferred alkanolamines according to the present invention include, but are not limited to, monoethanolamine, diethanolamine and triethanolamine. More preferred are monoethanolamine, diethanolamine. Most preferred is monoethanolamine. When added to hydrochloric acid a Lewis acid/base adduct is formed where the primary amino group acts as a Lewis base and the proton of the HCl as Lewis acid. The formed adduct greatly reduces the hazardous effects of the hydrochloric acid on its own, such as the fuming/vapor pressure effect, the hygroscopicity, and the highly corrosive nature. Various organic acids are also contemplated according to a preferred embodiment of the present invention.

The molar ratio of the two main components can be adjusted or determined depending on the intended application and the desired solubilizing ability. While a molar ratio of HCl:MEA of 1:1 can be used, results are significantly optimized when working above a 2:1 ratio and preferably above a 3:1 ratio. According to a preferred embodiment where the strong acid is HCl, one can increase the ratio of the HCl component to increase the solubilizing ability of the composition while still providing at least one of the following advantages: health; safety; environmental; and operational advantages over hydrochloric acid.

While an alkanolamine such as monoethanolamine is a compound known by the person of ordinary skill in the art, the latter knows that such a compound is not to be mixed with a strong acid such as HCl. In fact, the person skilled in the art will note upon review of the DOW safety data sheet for monoethanolamine LFG 85 that it indicates that one must avoid contact of this compound with strong acids.

Various corrosion inhibitors can be incorporated into a preferred composition of the present invention which comprises a strong acid and an alkanolamine to reduce corrosion on the steel which is contacted by the composition according to the present invention. According to a preferred embodiment of the present invention, the composition may further comprise organic compounds which may act as corrosion inhibitors selected from the group consisting of: acetylenic alcohols, aromatic or aliphatic aldehydes (e.g. $\alpha,\beta$-unsaturated aldehydes), alkylphenones, amines, amides, nitrogen-containing heterocycles (e.g. imidazoline-based), iminium salts, triazoles, pyridine and its derivatives or salts, quinoline derivatives, thiourea derivatives, thiosemicarbazides, thiocyanates, quaternary amine salts, and condensation products of carbonyls and amines. Intensifiers which can be incorporated into compositions according to the present invention are selected from the group consisting of: formic acid, potassium iodide, antimony oxide, copper iodide, sodium iodide, lithium iodide, aluminium chloride, bismuth oxide, calcium chloride, magnesium chloride and combinations of these. Preferably, an iodide compound such as potassium iodide is used.

Other additives can be optionally added to a composition according to a preferred embodiment of the present invention. A non-limiting list of such common additives includes iron control agents (e.g. reducing agents), water-wetting surfactants, non-emulsifiers, de-emulsifiers, foaming agents, antisludging agents, clay and/or fines stabilizer, scale inhibitors, mutual solvents, friction reducer.

Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which works well at low concentrations. It is however a very toxic/flammable chemical to handle as a concentrate, so care must be taken when exposed to the concentrate. In the composition according to the present invention, it is preferred to use 2-Propyn-1-ol, complexed with methyloxirane, as this is a much safer derivative to handle. Basocorr® PP is an example of such a compound.

Metal iodides or iodates such as potassium iodide, sodium iodide, cuprous iodide and lithium iodide can potentially be used as corrosion inhibitor intensifier along with the composition according to preferred embodiments of the present invention. In fact, potassium iodide is a metal iodide traditionally used as corrosion inhibitor intensifier, however it is expensive, but works extremely well. It is non-regulated and safe to handle. The iodide or iodate is preferably present in a weight percentage ranging from 0.1 to 5 wt %, more preferably from 0.2 to 3 wt %, yet even more preferably from 0.25 to 2 wt %.

Example 1—Process to Prepare a Composition According to a Preferred Embodiment of the Invention Monoethanolamine (MEA) and hydrochloric acid are used as starting reagents. To obtain a 4.1:1 molar ratio of MEA to HCl, one must first mix 165 g of MEA with 835 g of water. This forms the monoethanolamine solution. Subsequently, one takes 370 ml of the previously prepared monoethanolamine solution and mixes with 350 ml of HCl aq. 36% (22 Baume). In the event that additives are used, they are added after thorough mixing of the MEA solution and HCl. For example, potassium iodide can be added at this point as well as any other component desired to optimize the performance of the composition according to the present invention. Circulation is maintained until all products have been solubilized. Additional products can now be added as required.

The resulting composition of Example 1 is a clear (slightly yellow) liquid having shelf-life of greater than 1 year. It has a boiling point temperature of approximately 100° C. It has a specific gravity of 1.1±0.02. It is completely soluble in water and its pH is less than 1. The freezing point was determined to be less than −35° C.

The organic component in the composition is biodegradable. The composition is classified as a mild irritant according to the classifications for skin tests. The composition is substantially lower fuming compared to 15% HCl. Toxicity testing was calculated using surrogate information and the $LD_{50}$ was determined to be greater than—1300 mg/kg.

TABLE 1

Content of preferred embodiments of compositions of Examples 1, 2 and 3

| Example 1 | Example 2 | Example 3 |
|---|---|---|
| MEA:HCl | MEA-HCl | MEA-HCl |
| 1:4.1 molar ratio | 1:6.4 molar ratio | 1:9.9 molar ratio |
| 165 g MEA | 165 g MEA | 165 g MEA |
| 835 g Water | 835 g Water | 835 g Water |
| ==> MEA mixture | ==> MEA mixture | ==> MEA mixture |
| 370 ml of the MEA mixture + 350 ml HCl 22 Baume | 370 ml of the MEA mixture + 550 ml HCl 22 Baume | 370 ml of the MEA mixture + 850 ml HCl 22 Baume |

The content of HCl in the composition of Example 1 corresponds to the content of HCl in a 15% HCl composition. Similarly, Example 2 corresponds to the content of HCl in a 20% HCl composition. As well, Example 3 corresponds to the content of HCl in a 25% HCl composition.

TABLE 2

Properties of prepared compositions according to preferred embodiments of the present invention

| | MEA:HCl 1:4.1 molar ratio 100% | MEA:HCl 1:6.4 molar ratio 100% | MEA:HCl 1:9.9 molar ratio 100% |
|---|---|---|---|
| Appearance | Transparent, slight yellow | Transparent, slight yellow | Transparent, slight yellow |
| Specific Gravity at 23° C. | 1.1 | 1.121 | 1.135 |
| Salinity, % | 31.20% | 36.80% | 40.00 |
| Odor | slight sharp | sharp | sharp |
| Boiling Point | 100° C. | 100° C. | 100° C. |
| Freezing Point | −35° C. | −35° C. | −35° C. |
| Acid Strength, ml 1N NaOH | 4.9 | 6.3 | 7.5 |
| pH | −0.11 | −0.41 | −0.73 |

According to a preferred embodiment of the present invention, the composition comprising an alkanolamine and a strong acid may further comprise a corrosion inhibition package itself comprising a terpene; a α,β-unsaturated aldehyde with no methyl group at the alpha position; at least one amphoteric surfactant; and a solvent. Preferably, the α,β-unsaturated aldehyde with no methyl group at the alpha position can be used, examples of such aldehydes include but are not limited to citral and cinnamaldehyde (and derivatives thereof). These components are preferably present in an amount ranging from 0.025 to 0.5% in the final modified acid composition.

In other preferred embodiments of the present invention, 2-Propyn-1-ol, complexed with methyloxirane can be present in a range of 0.05-5.0 wt/wt %, preferably it is present in an amount ranging from 0.1 to 3 wt %, even more preferably from 0.5 to 2.0 wt/wt % and yet even more preferably from 0.75 to 1.5 wt/wt %. As a substitute for potassium iodide one could use sodium iodide, copper iodide and lithium iodide. However, potassium iodide is the most preferred.

According to a preferred embodiment of the present invention the corrosion package may comprise terpene compounds. The terpenes considered by the inventors to achieve desirable corrosion inhibition results comprise: monoterpenes (acyclic); monocyclic terpenes; and beta-Ionone. Exemplary but non-limiting compounds of some of the previously listed terpene sub-classes comprise: for monoterpenes: citral (mixture of geranial and neral); citronellal; geraniol; and ocimene; for monocyclic terpenes: alpha-terpinene; carvone; p-cymene. More preferably, the terpenes are selected from the group consisting of: citral; ionone; ocimene; and cymene.

It is preferable that the corrosion inhibition package comprises a surfactant which is environmentally friendly. More preferably, the surfactant is capable of withstanding exposure to temperatures of up to least 220° C. for a duration of 2 to 4 hours in a closed environment without undergoing degradation.

Preferably, surfactants which are amhoteric are present in the corrosion inhibition package. Preferably, the amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from $C_8$ to $C_{16}$. Most preferably, the amido betaine comprising a hydrophobic tail from $C_8$ to $C_{16}$ is cocamidobetaine.

Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from $C_8$ to $C_{16}$. Most preferably, the dicarboxylic surfactant is sodium lauriminodipropionate.

Some preferred embodiments use corrosion inhibition package comprising cocamidopropyl betaine and ß-Alanine, N-(2-carboxyethyl)-N-dodecyl-, sodium salt (1:1).

According to a preferred embodiment of the present invention, when preparing an acidic composition comprising a corrosion inhibition package, metal iodides or iodates such as potassium iodide, sodium iodide, cuprous iodide and lithium iodide can be added as corrosion inhibitor intensifier. The iodide or iodate is preferably present in a weight/volume percentage ranging from 0.1 to 1.5%, more preferably from 0.25 to 1.25%, yet even more preferably 1% by weight/volume of the acidic composition. Most preferably, the iodide used is potassium iodide.

Preferably, the terpene is present in an amount ranging from 2% to 25% by volume of the total volume of the corrosion inhibition package.

According to a preferred embodiment, when present, the propargyl alcohol or derivative thereof is present in an amount ranging from 20% to 55% by volume of the total volume of the corrosion inhibition package.

Preferably, the at least one surfactant is present in an amount ranging from 2% to 20% by volume of the total volume of the corrosion inhibition package.

Preferably, the solvent is present in an amount ranging from 10% to 45% by volume of the total volume of the corrosion inhibition package.

According to a preferred embodiment of the present invention, the corrosion package comprises: 2-Propyn-1-ol, compd. with methyloxirane; ß-Alanine, N-(2-carboxyethyl)-N-dodecyl-, sodium salt (1:1); cocamidopropyl betaine; (±)-3,7-Dimethyl-2,6-octadienal (Citral); and isopropanol. More preferably, the composition comprises 38.5% of 2-Propyn-1-ol, compd. with methyloxirane; 5% of β-Alanine, N-(2-carboxyethyl)-N-dodecyl-, sodium salt (1:1); 5% of cocamidopropyl betaine; 20% of (±)-3,7-Dimethyl-2,6-octadienal (Citral); and 31.5% of isopropanol (all percentages are volume percentages).

When used with a composition according to a preferred embodiment of the present invention, citral is present in a concentration ranging from 5 to 30 vol % of the total volume of the corrosion inhibition package; cinnamaldehyde can be present in a concentration ranging from 5 to 30 vol %; and cocamidobetaine can be present in a concentration ranging from 2.5 to 15 vol %. Depending on various factors, such as temperature, acid, metal, etc. preferred corrosion inhibitor package loadings within the acid compositions can range between 0.1 to 7.5% vol/vol. More preferably, between 0.1 and 5% vol/vol. Various biodegradation, toxicity and bioaccumulation testing carried out have indicated that most of the compositions using those components have been identified as satisfactorily meeting the requirements for listing under a classification of Yellow for offshore use in the North Sea (Norway).

Corrosion Testing

Compositions according to preferred embodiments of the present invention were exposed to corrosion testing. In most cases, corrosion packages were added to the various acid fluids. The % of the corrosion package component indicates its % within the final blended composition (acid+corrosion inhibitor). The results of the corrosion tests are reported in Tables 3 through 25. The controls used were compositions of HCl. Coupons of various steel grades were exposed to the various listed compositions for various periods of time at varying temperatures. A preferable result is one where the lb/ft2 corrosion number is at or below 0.05. More preferably, that number is at or below 0.02.

TABLE 3

Corrosion testing comparison between MEA-HCl using no additive - run time of 6 hours on 1018 steel coupons at a temperature of 110° C. having a surface area of 41.4 cm$^2$ (coupon density of 7.86 g/cc)

| Fluid | Temp ° C. | Corrosion Package | Initial Wt. (g) | Final wt. (g) | Loss wt. (g) | Run Time (hours) | Mils/yr | mm/ year | lb/ft2 |
|---|---|---|---|---|---|---|---|---|---|
| 15% HCl | 110 | none | 74.143 | 48.421 | 25.722 | 6 | 45436.180 | 1154.079 | 1.273 |
| Example 1 diluted to 50% | 110 | none | 74.181 | 62.579 | 11.603 | 6 | 20495.131 | 520.576 | 0.574 |

TABLE 4

Corrosion testing comparison between MEA-HCl using various additives - run time varying between 2 and 6 hours on L-80 steel coupons at various temperatures having a surface area of 28.0774 cm$^2$ (coupon density of 7.86 g/cc)

| Fluid | Temp | Corrosion | Loss wt. | Run | Mils/yr | mm/year | lb/ft2 |
|---|---|---|---|---|---|---|---|
| Example 1 | 130 | 2.0% CI-5 | 0.194 | 6 | 504.248 | 12.808 | 0.014 |
| Example 1 | 130 | 3.0% CI-5 | 0.276 | 6 | 718.345 | 18.246 | 0.020 |
| Example 1 | 150 | 2.0% CI-5 | 0.243 | 4 | 950.544 | 24.144 | 0.018 |
| Example 1 | 150 | 3.0% CI-5 | 0.231 | 4 | 903.6614 | 22.953 | 0.017 |
| Example 1 | 200 | 7.5% CI-5 | 0.355 | 2 | 2775.448 | 70.496 | 0.026 |
| Example 1 | 110 | 1.75% CI-5 | 0.077 | 6 | 200.0323 | 5.081 | 0.006 |

The dilution of the fluid is done by using the concentrate (Example 1) composition and diluting with tap water to half the original concentration.

CI-1A refers to potassium iodide; CI-5 refers to a proprietary corrosion inhibitor package comprising a terpene; a cinnamaldehyde or a derivative thereof; at least one amphoteric surfactant; and a solvent.

TABLE 5

Corrosion testing comparison between MEA-HCl and DEA-HCl using various additives - run time varying between 2 and 6 hours on various steel coupons at a temperature of 110° C. having a surface area of 28.0774 cm$^2$ (coupon density of 7.86 g/cc)

| Steel | Fluid | Corrosion Package | Initial Wt. (g) | Final wt. (g) | Loss wt. (g) | Run Time (hr) | Mils/yr | mm/year | lb/ft2 |
|---|---|---|---|---|---|---|---|---|---|
| N80 | Example | 1.75% | 61.24 | 61.137 | 0.108 | 6 | 281.555 | 7.152 | 0.00 |
| L80 | 50% | 1.75% | 60.55 | 60.3834 | 0.167 | 4 | 651.667 | 16.552 | 0.01 |
| N80 | 50% | 1.75% | 60.34 | 60.236 | 0.106 | 4 | 414.52 | 10.529 | 0.00 |

TABLE 6

Corrosion testing comparison between MEA-HCl using various additives - run time of 6 hours on 1018 steel coupons at a temperature of 90° C. having a surface area of 41.4 cm$^2$ (coupon density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| Example 1 diluted to 50% | 0.75% CI-5, 0.25% CI-1A | 74.1448 | 74.0485 | 0.096 | 170.1068 | 4.321 | 0.005 |
| 50% DEA:HCl 1:4.1 | 0.75% CI-5, 0.25% CI-1A | 74.224 | 74.1375 | 0.087 | 152.7958 | 3.881 | 0.004 |
| Example 1 diluted to 50% | None | 74.1723 | 65.8583 | 8.314 | 14686.06 | 373.026 | 0.411 |
| Example 1 diluted to 50% | 0.25% CI-5, 0.15% CI-1A | 74.0726 | 73.4539 | 0.619 | 1092.888 | 27.759 | 0.031 |
| Example 1 diluted to 50% | 0.50% CI-5, 0.15% CI-1A | 74.1381 | 73.744 | 0.394 | 696.1484 | 17.682 | 0.019 |
| Example 2 diluted to 50% | None | 74.0655 | 61.9836 | 12.082 | 21341.78 | 542.081 | 0.598 |
| Example 2 diluted to 50% | 0.25% CI-5, 0.15% CI-1A | 74.1492 | 71.8392 | 2.310 | 4080.443 | 103.643 | 0.114 |
| Example 2 diluted to 50% | 0.50% CI-5, 0.15% CI-1A | 74.1115 | 73.6647 | 0.447 | 789.239 | 20.047 | 0.022 |
| Example 3 diluted to 50% | None | 74.1601 | 59.278 | 14.882 | 26288.12 | 667.718 | 0.736 |
| Example 3 diluted to 50% | 0.25% CI-5, 0.15% CI-1A | 74.153 | 70.3044 | 3.849 | 6798.266 | 172.676 | 0.190 |
| Example 3 diluted to 50% | 0.50% CI-5, 0.15% CI-1A | 74.1107 | 73.3095 | 0.801 | 1415.26 | 35.948 | 0.040 |

TABLE 7

Corrosion testing comparison between MEA-HCl using various additives - run time of 6 hours on L80 steel coupons at a temperature of 120° C. having a surface area of 41.4 cm$^2$ (coupon density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| Example 1 diluted to 50% | 0.75% CI-5, 0.50% CI-1A | 59.8578 | 59.564 | 0.294 | 518.9759 | 13.182 | 0.015 |

TABLE 7-continued

Corrosion testing comparison between MEA-HCl using various additives - run time of 6 hours on L80 steel coupons at a temperature of 120° C. having a surface area of 41.4 cm$^2$ (coupon density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| Example 1 diluted to 50% | 1.0% CI-5, 0.75% CI-1A | 60.2693 | 59.9396 | 0.330 | 582.3906 | 14.793 | 0.016 |
| Example 1 diluted to 50% | 1.25% CI-5, 0.75% CI-1A | 60.4076 | 59.5108 | 0.897 | 1584.131 | 40.237 | 0.044 |

TABLE 8

Corrosion testing comparison between MEA-HCl using various additives - run time of 6 hours on 1018 steel coupons at a temperature of 90° C. having a surface area of 41.4 cm$^2$ (coupon density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| Example 1 diluted to 50% | 0.60% CI-5 0.25% CI-1A | 74.0052 | 73.7828 | 0.222 | 392.8531 | 9.978 | 0.011 |
| Example 1 diluted to 50% | 0.50% CI-5, 0.25% CI-1A | 74.1151 | 73.823 | 0.292 | 515.973 | 13.106 | 0.014 |
| Example 2 diluted to 50% | 0.60% CI-5 0.25% CI-1A | 74.0215 | 73.8259 | 0.196 | 345.5129 | 8.776 | 0.010 |
| Example 2 diluted to 50% | 0.50% CI-5 0.25% CI-1A | 74.063 | 73.7148 | 0.348 | 615.0694 | 15.623 | 0.017 |
| Example 3 diluted to 50% | 0.60% CI-5 0.25% CI-1A | 74.0873 | 73.5028 | 0.585 | 1032.476 | 26.225 | 0.029 |
| Example 3 diluted to 50% | 0.50% CI-5 0.25% CI-1A | 74.0916 | 73.51 | 0.582 | 1027.353 | 26.095 | 0.029 |

TABLE 9

Corrosion testing comparison between MEA-HCl using various additives - varying run times on various steel coupons at various temperature (coupon density of 7.86 g/cc)

| Coupon | Fluid | Temp ° C. | Run time | Corrosion Package | Surface area | Mils/yr | Mm/year | Lb/ft2 |
|---|---|---|---|---|---|---|---|---|
| N80 | Example 1 (50% dilution) | 90 | 6 | 0.6% CI-5 0.025% CI-1A | 28.0774 | 240.403 | 6.106 | 0.007 |
| J55 | Example 1 (50% dilution) | 90 | 6 | 0.6% CI-5 0.025% CI-1A | 28.922 | 138.310 | 3.513 | 0.004 |
| P110 | Example 1 (50% dilution) | 90 | 4 | 0.6% CI-5 0.025% CI-1A | 28.922 | 364.487 | 9.258 | 0.007 |
| QT900 | Example 1 (50% dilution) | 90 | 6 | 0.6% CI-5 0.025% CI-1A | 34.31 | 93.784 | 2.382 | 0.003 |
| N80 | Example 1 (50% dilution) | 110 | 6 | 0.75% CI-5 0.050% CI-1A | 28.0774 | 396.418 | 10.069 | 0.011 |
| J55 | Example 1 (50% dilution) | 110 | 6 | 0.75% CI-5 0.050% CI-1A | 28.922 | 144.632 | 3.674 | 0.004 |
| P110 | Example 1 (50% dilution) | 110 | 4 | 0.75% CI-5 0.050% CI-1A | 28.922 | 701.287 | 17.813 | 0.013 |
| QT900 | Example 1 (50% dilution) | 110 | 6 | 0.75% CI-5 0.050% CI-1A | 34.31 | 339.966 | 8.635 | 0.010 |

TABLE 9-continued

Corrosion testing comparison between MEA-HCl using various additives - varying run times on various steel coupons at various temperature (coupon density of 7.86 g/cc)

| Coupon | Fluid | Temp ° C. | Run time | Corrosion Package | Surface area | Mils/yr | Mm/year | Lb/ft2 |
|---|---|---|---|---|---|---|---|---|
| 1018 | Example 1 (50% dilution) | 110 | 6 | 0.75% CI-5 0.050% CI-1A | 33.22 | 313.9176 | 7.974 | 0.009 |
| L80 | Example 1 (dilution to 33% of stock solution) | 90 | 6 | 0.6% CI-5 0.025% CI-1A 0.1% NE-1 | 28.0774 | 278.170 | 7.066 | 0.008 |
| L80 | Example 1 (dilution to 33% of stock solution) | 120 | 6 | 0.6% CI-5 0.025% CI-1A 0.1% NE-1* | 28.0774 | 1773.724 | 45.053 | 0.050 |
| L80 | Example 1 (dilution to 33% of stock solution) | 120 | 6 | 0.75% CI-5 0.05% CI-1A 0.1% NE-1 | 28.0774 | 798.566 | 20.284 | 0.022 |
| P110 | Example 1 (dilution to 33% of stock solution) | 120 | 6 | 0.925% CI-5 0.0625% CI-1A 0.1% NE-1 | 28.922 | 1398.528 | 35.523 | 0.040 |
| P110 | Example 1 (dilution to 33% of stock solution) | 120 | 6 | 1.25% CI-5 0.095% CI-1A 0.1% NE-1 | 28.922 | 834.161 | 21.188 | 0.024 |

TABLE 10

Corrosion testing of various MEA-HCl compositions using various additives - varying run times on various steel coupons at various temperatures (coupon density of 7.86 g/cc)

| Coupon | Fluid | Temp ° C. | Run time (hours) | Corrosion Package | Surface area (cm$^2$) | Mils/yr | Mm/year | Lb/ft2 |
|---|---|---|---|---|---|---|---|---|
| P110 | Example 2 (50% dilution) | 90 | 72 | 1% CI-5 0.1% CI-1A | 28.922 | 66.648 | 1.693 | 0.023 |
| P110 | Example 2 (50% dilution) | 90 | 72 | 2% CI-5 0.2% CI-1A | 28.922 | 36.832 | 0.936 | 0.013 |
| P110 | Example 2 (50% dilution) | 90 | 72 | 3% CI-5 0.3% CI-1A | 28.922 | 34.957 | 0.888 | 0.012 |
| P110 | Example 2 (50% dilution) | 90 | 168 | 2% CI-5 0.2% CI-1A | 28.922 | 38.063 | 0.967 | 0.031 |
| P110 | Example 2 (50% dilution) | 90 | 168 | 3% CI-5 0.3% CI-1A | 28.922 | 33.431 | 0.849 | 0.027 |
| N80 | Example 1 (50% dilution) | 60 | 6 | 0.25% CI-5 | 28.0774 | 123.197 | 3.129 | 0.003 |
| J55 | Example 1 (50% dilution) | 60 | 6 | 0.25% CI-5 | 28.922 | 79.901 | 2.029 | 0.002 |
| 1018 | Example 1 (50% dilution) | 60 | 6 | 0.25% CI-5 | 33.22 | 431.472 | 10.959 | 0.012 |
| J55 | Example 1 (50% dilution) | 130 | 6 | 1.75% CI-5 0.125% CI-1A | 28.922 | 515.314 | 13.089 | 0.014 |
| 1018 | Example 1 (50% dilution) | 130 | 6 | 1.75% CI-5 0.125% CI-1A | 33.22 | 1371.683 | 34.841 | 0.038 |
| N80 | Example 1 (50% dilution) | 130 | 6 | 2.25% CI-5 0.175% CI-1A | 28.0774 | 1671.884 | 42.466 | 0.047 |
| 1018 | Example 1 (50% dilution) | 130 | 6 | 2.25% CI-5 0.175% CI-1A | 33.22 | 1289.351 | 32.750 | 0.036 |

TABLE 10-continued

Corrosion testing of various MEA-HCl compositions using various additives - varying run times on various steel coupons at various temperatures (coupon density of 7.86 g/cc)

| Coupon | Fluid | Temp ° C. | Run time (hours) | Corrosion Package | Surface area (cm²) | Mils/yr | Mm/year | Lb/ft2 |
|---|---|---|---|---|---|---|---|---|
| N80 | Example 1 (50% dilution) | 150 | 4 | 2.25% CI-5 0.225% CI-1A | 28.0774 | 1498.679 | 38.066 | 0.028 |
| N80 | Example 1 (50% dilution) | 150 | 4 | 2.50% CI-5 0.275% CI-1A | 28.0774 | 1058.374 | 26.883 | 0.020 |

TABLE 11

Corrosion testing of the composition of Example 1 (diluted to 50%) using various concentrations of the same additives - varying run times on L80 steel coupons at a temperature of 150° C. or 170° C. (coupon density of 7.86 g/cc) (coupon surface area of 28.0774 cm²)

| Fluid | Temp ° C. | Run time (hours) | Corrosion Package | Mils/yr | Mm/year | Lb/ft2 |
|---|---|---|---|---|---|---|
| Example 1 (50% dilution) | 150 | 4 | 2.0% CI-5 0.25% CI-1A | 752.4651268 | 19.113 | 0.014 |
| Example 1 (50% dilution) | 150 | 4 | 2.5% CI-5 0.25% CI-1A | 553.6049245 | 14.062 | 0.010 |
| Example 1 (50% dilution) | 170 | 3 | 7.5% CI-5 0.75% CI-1A | 2690.017248 | 68.326 | 0.038 |

TABLE 12

Corrosion testing of various MEA-HCl compositions using various additives - varying run times on L80 steel coupons at a temperature of 120° C. (coupon density of 7.86 g/cc)

| Fluid | Run time (hours) | Corrosion Package | Mils/yr | Mm/year | Lb/ft2 |
|---|---|---|---|---|---|
| Example 1 (50% dilution) | 3 | 0.5% CI-5 0.25% CI-1A | 492.2669054 | 12.504 | 0.007 |
| Example 1 (50% dilution) | 3 | 0.75% CI-5 0.5% CI-1A | 557.9024928 | 14.171 | 0.008 |
| Example 2 (dilution to 33% of stock solution) | 3 | 0.5% CI-5 0.25% CI-1A | 797.5244785 | 20.257 | 0.011 |
| Example 2 (dilution to 33% of stock solution) | 3 | 0.75% CI-5 0.5% CI-1A | 434.9659958 | 11.048 | 0.006 |
| Example 1 (dilution to 33% of stock solution) | 3 | 0.5% CI-5 0.25% CI-1A | 502.6852526 | 12.768 | 0.007 |
| Example 1 (dilution to 33% of stock solution) | 4 | 0.5% CI-5 0.25% CI-1A | 544.2284121 | 13.823 | 0.010 |
| Example 1 (dilution to 33% of stock solution) | 5 | 0.5% CI-5 0.25% CI-1A | 1210.820312 | 30.755 | 0.028 |
| Example 1 (50% dilution) | 4 | 0.5% CI-5 0.25% CI-1A | 566.4976292 | 14.389 | 0.011 |
| Example 1 (50% dilution) | 5 | 0.5% CI-5 0.25% CI-1A | 984.5338108 | 25.007 | 0.023 |

TABLE 13

Corrosion testing of various MEA-HCl compositions using various additives - varying run times on various steel coupons at a temperature of 90° C. (coupon density of 7.86 g/cc)

| Coupon | Fluid | Run time (hours) | Corrosion Package | Surface area (cm²) | Mils/yr | Mm/year | Lb/ft2 |
|---|---|---|---|---|---|---|---|
| L80 | Example 1 (50% dilution) | 72 | 1.5% CI-5 0.15% CI-1A | 28.0774 | 59.40628395 | 1.509 | 0.020 |
| P110 | Example 1 (50% dilution) | 72 | 1.5% CI-5 0.15% CI-1A | 28.922 | 41.69960594 | 1.059 | 0.014 |
| P110 | Example 1 (50% dilution) | 72 | 2.0% CI-5 0.2% CI-1A | 28.922 | 38.85501433 | 0.987 | 0.013 |
| L80 | Example 2 (50% dilution) | 6 | 0.5% CI-5 0.025% CI-1A | 28.0774 | 278.6907877 | 7.079 | 0.008 |

TABLE 13-continued

Corrosion testing of various MEA-HCl compositions using various additives - varying run times on various steel coupons at a temperature of 90° C. (coupon density of 7.86 g/cc)

| Coupon | Fluid | Run time (hours) | Corrosion Package | Surface area (cm$^2$) | Mils/yr | Mm/year | Lb/ft2 |
|---|---|---|---|---|---|---|---|
| N80 | Example 2 (50% dilution) | 6 | 0.5% CI-5 0.025% CI-1A | 28.0774 | 175.028233 | 4.446 | 0.005 |
| J55 | Example 2 (50% dilution) | 6 | 0.5% CI-5 0.025% CI-1A | 28.922 | 169.6640864 | 4.309 | 0.005 |
| P110 | Example 2 (50% dilution) | 6 | 0.5% CI-5 0.025% CI-1A | 28.922 | 214.4189945 | 5.446 | 0.006 |
| QT-900 | Example 2 (50% dilution) | 6 | 0.5% CI-5 0.025% CI-1A | 34.31 | 94.21005901 | 2.393 | 0.003 |
| 1018CS | Example 2 (50% dilution) | 6 | 0.5% CI-5 0.025% CI-1A | 33.22 | 1000.529698 | 25.413 | 0.028 |

TABLE 14

Corrosion testing comparison between MEA-HCl using various additives - during a 6 hour run time on various steel coupons at a temperature of 110° C. (coupon density of 7.86 g/cc)

| Coupon | Fluid | Corrosion Package | Surface area (cm$^2$) | Mils/yr | Mm/year | Lb/ft2 |
|---|---|---|---|---|---|---|
| L80 | Example 2 (50% dilution) | 0.75% CI-5 0.05% CI-1A | 28.0774 | 458.407277 | 11.644 | 0.013 |
| N80 | Example 2 (50% dilution) | 0.75% CI-5 0.05% CI-1A | 28.0774 | 460.4909464 | 11.696 | 0.013 |
| J55 | Example 2 (50% dilution) | 0.75% CI-5 0.05% CI-1A | 28.922 | 147.6659113 | 3.751 | 0.004 |
| P110 | Example 2 (50% dilution) | 0.75% CI-5 0.05% CI-1A | 28.922 | 249.3126516 | 6.333 | 0.007 |
| QT-900 | Example 2 (50% dilution) | 0.75% CI-5 0.05% CI-1A | 34.31 | 165.4004656 | 4.201 | 0.005 |
| 1018CS | Example 2 (50% dilution) | 0.75% CI-5 0.05% CI-1A | 33.22 | 195.2628915 | 4.960 | 0.005 |
| L80 | Example 2 (50% dilution) | 1.0% CI-5 0.075% CI-1A | 28.0774 | 616.2452371 | 15.653 | 0.017 |
| N80 | Example 2 (50% dilution) | 1.0% CI-5 0.075% CI-1A | 28.0774 | 515.9686453 | 13.106 | 0.014 |
| P110 | Example 2 (50% dilution) | 1.0% CI-5 0.075% CI-1A | 28.922 | 297.3546433 | 7.553 | 0.008 |

TABLE 15

Corrosion testing comparison between MEA-HCl using various additives - varying run times on various steel coupons at various temperatures (coupon density of 7.86 g/cc)

| Coupon | Fluid | Temp ° C. | Run time (hours) | Corrosion Package | Surface area (cm$^2$) | Mils/yr | Mm/year | Lb/ft2 |
|---|---|---|---|---|---|---|---|---|
| 1018CS | Example 1 (dilution to 10% of stock solution) | 40 | 6 | 0.5% CI-5 0.025% CI-1A 0.1% NE-1 | 33.22 | 39.185 | 0.995 | 0.001 |
| 1018CS | Example 1 (dilution to 25% of stock solution) | 40 | 6 | 0.5% CI-5 0.025% CI-1A 0.1% NE-1 | 33.22 | 37.864 | 0.962 | 0.001 |
| 1018CS | Example 1 (dilution to 33% of stock solution) | 40 | 6 | 0.5% CI-5 0.025% CI-1A 0.1% NE-1 | 33.22 | 39.405 | 1.001 | 0.001 |

TABLE 15-continued

Corrosion testing comparison between MEA-HCl using various additives - varying run times on various steel coupons at various temperatures (coupon density of 7.86 g/cc)

| Coupon | Fluid | Temp ° C. | Run time (hours) | Corrosion Package | Surface area (cm$^2$) | Mils/yr | Mm/year | Lb/ft2 |
|---|---|---|---|---|---|---|---|---|
| 1018CS | Example 1 (dilution to 10% of stock solution) | 70 | 6 | 0.5% CI-5 0.025% CI-1A 0.1% NE-1 | 33.22 | 129.441 | 3.288 | 0.004 |
| 1018CS | Example 1 (dilution to 25% of stock solution) | 70 | 6 | 0.5% CI-5 0.025% CI-1A 0.1% NE-1 | 33.22 | 123.278 | 3.131 | 0.003 |
| 1018CS | Example 1 (dilution to 33% of stock solution) | 70 | 6 | 0.5% CI-5 0.025% CI-1A 0.1% NE-1 | 33.22 | 139.788 | 3.551 | 0.004 |
| L80 | Example 1 (50% dilution) | 150 | 4 | 3% CI-5 0.3% CI-1A | 28.0774 | 1383.426 | 35.139 | 0.026 |
| J55 | Example 1 (dilution to 90% of stock solution) | 110 | 6 | 1.5% CI-6 0.15% CI-1A | 28.922 | 227.567 | 5.780 | 0.006 |
| J55 | Example 1 (dilution to 90% of stock solution) | 110 | 6 | 1.25% CI-6 0.1% CI-1A | 28.922 | 313.790 | 7.970 | 0.009 |
| L80 | Example 1 (dilution to 90% of stock solution) | 110 | 6 | 1.25% CI-6 0.1% CI-1A | 28.0774 | 714.178 | 18.140 | 0.020 |
| N80 | Example 1 (dilution to 90% of stock solution) | 110 | 6 | 1.25% CI-6 0.1% CI-1A | 28.0774 | 1172.325 | 29.777 | 0.033 |
| P110 | Example 1 (dilution to 90% of stock solution) | 110 | 6 | 1.25% CI-6 0.1% CI-1A | 28.922 | 1038.971 | 26.390 | 0.029 |
| QT-900 | Example 1 (dilution to 90% of stock solution) | 110 | 6 | 1.25% CI-6 0.1% CI-1A | 34.31 | 663.520 | 16.853 | 0.019 |
| 1018CS | Example 1 (dilution to 90% of stock solution) | 110 | 6 | 1.25% CI-6 0.1% CI-1A | 33.22 | 779.731 | 19.805 | 0.022 |
| L80-CR13 | Example 1 (dilution to 90% of stock solution) | 110 | 3 | 1.25% CI-6 0.1% CI-1A | 8.47 | 286.649 | 7.281 | 0.004 |
| J55 | Example 1 (dilution to 90% of stock solution) | 110 | 6 | 0.75% CI-5 0.05% CI-1A | 28.922 | 135.276 | 3.436 | 0.004 |
| L80 | Example 1 (dilution to 90% of stock solution) | 110 | 6 | 0.75% CI-5 0.05% CI-1A | 28.0774 | 201.335 | 5.114 | 0.006 |
| N80 | Example 1 (dilution to 90% of stock solution) | 110 | 6 | 0.75% CI-5 0.05% CI-1A | 28.0774 | 178.154 | 4.525 | 0.005 |

TABLE 15-continued

Corrosion testing comparison between MEA-HCl using various additives - varying run times on various steel coupons at various temperatures (coupon density of 7.86 g/cc)

| Coupon | Fluid | Temp ° C. | Run time (hours) | Corrosion Package | Surface area (cm$^2$) | Mils/yr | Mm/year | Lb/ft2 |
|---|---|---|---|---|---|---|---|---|
| P110 | Example 1 (dilution to 90% of stock solution) | 110 | 6 | 0.75% CI-5 0.05% CI-1A | 28.922 | 189.134 | 4.804 | 0.005 |
| QT-900 | Example 1 (dilution to 90% of stock solution) | 110 | 6 | 0.75% CI-5 0.05% CI-1A | 34.31 | 165.187 | 4.196 | 0.005 |
| QT-800 | Example 1 (dilution to 90% of stock solution) | 110 | 6 | 0.75% CI-5 0.05% CI-1A | 34.31 | 135.134 | 3.432 | 0.004 |
| 1018CS | Example 1 (dilution to 90% of stock solution) | 110 | 6 | 0.75% CI-5 0.05% CI-1A | 33.22 | 270.330 | 6.866 | 0.008 |

CI-6: is a proprietary corrosion inhibitor comprising citral and cinnamaldehyde. CI-4A: propargyl alcohol with methyloxirane

TABLE 16

Corrosion testing comparison between MEA-HCl using various additives - varying run times on various steel coupons at a temperature of 120° C. (coupon density of 7.86 g/cc)

| Coupon | Fluid | Run time (hours) | Corrosion Package | Surface area (cm$^2$) | Mils/yr | Mm/year | Lb/ft2 |
|---|---|---|---|---|---|---|---|
| P110 | Example 1 (diluted to 20% of stock solution) | 6 | 0.90% CI-5 CNE | 28.922 | 787.8886636 | 20.012 | 0.022 |
| QT-900 | Example 1 (diluted to 20% of stock solution) | 6 | 0.90% CI-5 CNE | 34.31 | 1283.771913 | 32.608 | 0.036 |
| P110 | Example 1 (diluted to 20% of stock solution) | 6 | 1.0% CI-5 CNE | 28.922 | 875.6285116 | 22.241 | 0.025 |
| P110 | Example 1 (diluted to 20% of stock solution) | 6 | 1.25% CI-5 CNE | 28.922 | 602.5477167 | 15.305 | 0.017 |
| P110 | Example 1 (diluted to 20% of stock solution) | 6 | 1.5% CI-5 CNE | 28.922 | 787.635811 | 20.006 | 0.022 |
| QT-100 | Example 1 (diluted to 20% of stock solution) | 2 | 1.25% CI-5 CNE | 28.922 | 221.4988669 | 5.626 | 0.002 |
| QT-1300 | Example 1 (diluted to 20% of stock solution) | 2 | 1.25% CI-5 CNE | 29.7 | 549.5832215 | 13.959 | 0.005 |

TABLE 16-continued

Corrosion testing comparison between MEA-HCl using various additives - varying run times on various steel coupons at a temperature of 120° C. (coupon density of 7.86 g/cc)

| Coupon | Fluid | Run time (hours) | Corrosion Package | Surface area (cm²) | Mils/yr | Mm/year | Lb/ft2 |
|---|---|---|---|---|---|---|---|
| QT-100 | Example 1 (diluted to 20% of stock solution) | 3 | 1.25% CI-5 CNE | 28.922 | 293.3090019 | 7.450 | 0.004 |
| QT-1300 | Example 1 (diluted to 20% of stock solution) | 3 | 1.25% CI-5 CNE | 29.7 | 523.4829431 | 13.296 | 0.007 |
| QT-100 | Example 1 (diluted to 20% of stock solution) | 4 | 1.25% CI-5CNE | 28.922 | 429.3436941 | 10.905 | 0.008 |

TABLE 17

Corrosion testing comparison between MEA-HCl using various additives - run time of 6 hours on various steel coupons at a temperature of 90° C. (coupon density of 7.86 g/cc)

| Coupon | Fluid | Corrosion Package | Surface area (cm²) | Mils/yr | Mm/year | Lb/ft2 |
|---|---|---|---|---|---|---|
| P110 | Example 2 (diluted to 20% of stock solution) | 0.5% CI-5CNE | 34.839 | 215.158445 | 5.465 | 0.006 |
| QT-100 | Example 2 (diluted to 20% of stock solution) | 0.5% CI-5CNE | 30.129 | 244.1796076 | 6.202 | 0.007 |
| QT-1300 | Example 2 (diluted to 20% of stock solution) | 0.5% CI-5CNE | 32.064 | 329.1078442 | 8.359 | 0.009 |
| P110 | Example 2 (diluted to 20% of stock solution) | 0.5% CI-5CNE | 34.839 | 221.8755867 | 5.636 | 0.006 |
| QT-100 | Example 2 (diluted to 20% of stock solution) | 0.5% CI-5CNE | 30.129 | 276.7045255 | 7.028 | 0.008 |
| QT-1300 | Example 2 (diluted to 20% of stock solution) | 0.5% CI-5CNE | 32.064 | 342.56409 | 8.701 | 0.010 |

TABLE 18

Corrosion testing comparison between MEA-HCl using various additives - run time of 4 hours on L80 steel coupons at a temperature of 150° C. (coupon density of 7.86 g/cc)

| Fluid | Corrosion Package | Surface area (cm²) | Mils/yr | Mm/year | Lb/ft2 |
|---|---|---|---|---|---|
| Example 2 (50% dilution) | 3.0% CI-5 0.3 % CI-1A | 31.806 | 1361.945612 | 34.593 | 0.025 |
| Example 2 (50% dilution) | 2.5% CI-5 0.25% CI-1A | 31.806 | 1575.428604 | 40.016 | 0.029 |

TABLE 19

Corrosion testing comparison between MEA-HCl using various additives - various run time on L80 steel coupons at a temperature of 150° C. (coupon density of 7.86 g/cc) (surface area of coupons of 31.806 cm²)

| Fluid | Run time (hours) | Corrosion Package | Mils/yr | Mm/year | Lb/ft2 |
|---|---|---|---|---|---|
| Example 3 (50% dilution) | 4 | 2.5% CI-5 0.25% CI-1A | 1455.409087 | 36.967 | 0.027 |
| Example 3 (50% dilution) | 4 | 3.0% CI-5 0.3% CI-1A | 1308.14376 | 33.227 | 0.024 |
| Example 3 (50% dilution) | 4 | 3.0% CI-5 0.3% CI-1A 1.0% 6-3 | 958.7766021 | 24.353 | 0.018 |
| Example 3 (50% dilution) | 4 | 2.75% CI-5 0.25% CI-1A 1.0% 6-3 | 1047.066822 | 26.595 | 0.019 |
| Example 3 (50% dilution) | 4 | 2.75% CI-5 0.25% CI-1A 2.0% 6-3 | 1672.685799 | 42.486 | 0.031 |
| Example 3 (50% dilution) | 5 | 3.0% CI-5 0.3% CI-1A 1.0% 6-3 | 1338.424546 | 33.996 | 0.031 |

6-3 refers to a short chain ethoxylate of C6 and 3 ethoxylate groups acting as a non-ionic surfactant/solvent.

TABLE 20

Corrosion testing comparison between MEA-HCl using various additives - various run time on various steel coupons at a temperature of 120° C. (coupon density of 7.86 g/cc) (surface area of coupons of 31.806 cm$^2$)

| Coupon | Fluid | Run time (hours) | Corrosion Package | Surface area (cm$^2$) | Mils/yr | Mm/year | Lb/ft2 |
|---|---|---|---|---|---|---|---|
| P110 | Example 1 (diluted to 20% of stock solution) | 6 | 0.90% CI-5CNE | 28.922 | 787.8886636 | 20.012 | 0.022 |
| QT-900 | Example 1 (diluted to 20% of stock solution) | 6 | 0.90% CI-5CNE | 34.31 | 1283.771913 | 32.608 | 0.036 |
| P110 | Example 1 (diluted to 20% of stock solution) | 6 | 1.0% CI-5CNE | 28.922 | 875.6285116 | 22.241 | 0.025 |
| P110 | Example 1 (diluted to 20% of stock solution) | 6 | 1.25% CI-5CNE | 28.922 | 602.5477167 | 15.305 | 0.017 |
| P110 | Example 1 (diluted to 20% of stock solution) | 6 | 1.5% CI-5CNE | 28.922 | 787.635811 | 20.006 | 0.022 |
| QT-100 | Example 1 (diluted to 20% of stock solution) | 2 | 1.25% CI-5CNE | 28.922 | 221.4988669 | 5.626 | 0.002 |
| QT-1300 | Example 1 (diluted to 20% of stock solution) | 2 | 1.25% CI-5CNE | 29.7 | 549.5832215 | 13.959 | 0.005 |
| QT-100 | Example 1 (diluted to 20% of stock solution) | 3 | 1.25% CI-5CNE | 28.922 | 293.3090019 | 7.450 | 0.004 |
| QT-1300 | Example 1 (diluted to 20% of stock solution) | 3 | 1.25% CI-5CNE | 29.7 | 523.4829431 | 13.296 | 0.007 |
| QT-100 | Example 1 (diluted to 20% of stock solution) | 4 | 1.25% CI-5CNE | 28.922 | 429.3436941 | 10.905 | 0.008 |

TABLE 21

Corrosion testing comparison between MEA-HCl using various additives -run time of 6 hours on various steel coupons at a temperature of 90° C. (coupon density of 7.86 g/cc)

| Coupon | Fluid | Corrosion Package | Surface area (cm$^2$) | Mils/yr | Mm/year | Lb/ft2 |
|---|---|---|---|---|---|---|
| P110 | Example 2 (diluted to 20%) | 0.5% CI-5CNE | 34.839 | 215.158445 | 5.465 | 0.006 |
| QT-100 | Example 2 (diluted to 20%) | 0.5% CI-5CNE | 30.129 | 244.1796076 | 6.202 | 0.007 |
| QT-1300 | Example 2 (diluted to 20%) | 0.5% CI-5CNE | 32.064 | 329.1078442 | 8.359 | 0.009 |
| P110 | Example 2 (diluted to 20%) | 0.5% CI-5CNE | 34.839 | 221.8755867 | 5.636 | 0.006 |
| QT-100 | Example 2 (diluted to 20%) | 0.5% CI-5CNE | 30.129 | 276.7045255 | 7.028 | 0.008 |
| QT-1300 | Example 2 (diluted to 20%) | 0.5% CI-5CNE | 32.064 | 342.56409 | 8.701 | 0.010 |

CI5-CNE is the corrosion inhibitor CI-5 combined with potassium iodide dissolved therein and with a non-emulsifier

TABLE 22

Corrosion testing comparison between MEA-HCl using various additives - run time of 4 hours on L80 steel coupons at a temperature of 150° C. (coupon density of 7.86 g/cc) (surface area of coupons of 31.806 cm$^2$)

| Coupon | Fluid | Corrosion Package | Mils/yr | Mm/year | Lb/ft2 |
|---|---|---|---|---|---|
| L80 | Example 2 (diluted to 50%) | 3.0% CI-5 0.3% CI-1A | 1361.945612 | 34.593 | 0.025 |
| L80 | Example 2 (diluted to 50%) | 2.5% CI-5 0.25% CI-1A | 1575.428604 | 40.016 | 0.029 |

TABLE 23

Corrosion testing comparison between MEA-HCl using various additives - various run times on L80 steel coupons at a temperature of 150° C. (coupon density of 7.86 g/cc) (surface area of coupons of 31.806 cm$^2$)

| Fluid | Run time (hours) | Corrosion Package | Mils/yr | Mm/year | Lb/ft2 |
|---|---|---|---|---|---|
| Example 3 (diluted to 50%) | 4 | 2.5% CI-5 0.25% CI-1A | 1455.409087 | 36.967 | 0.027 |
| Example 3 (diluted to 50%) | 4 | 3.0% CI-5 0.3% CI-1A | 1308.14376 | 33.227 | 0.024 |
| Example 3 (diluted to 50%) | 4 | 3.0% CI-5 0.3% CI-1A 1.0% 6-3 | 958.7766021 | 24.353 | 0.018 |
| Example 3 (diluted to 50%) | 4 | 2.75% CI-5 0.25% CI-1A 1.0% 6-3 | 1047.066822 | 26.595 | 0.019 |
| Example 3 (diluted to 50%) | 4 | 2.75% CI-5 0.25% CI-1A 2.0% 6-3 | 1672.685799 | 42.486 | 0.031 |
| Example 3 (diluted to 50%) | 5 | 3.0% CI-5 0.3% CI-1A 1.0% 6-3 | 1338.424546 | 33.996 | 0.031 |

With respect to the corrosion impact of the composition on typical oilfield grade steel, it was established that it was clearly well below the acceptable corrosion limits set by industry for certain applications, such as spearhead applications or lower temperature scale treatments.

The corrosion testing carried out helps to determine the impact of the use of such modified acid composition according to the present invention compared to the industry standard (HCl blends or any other mineral or organic acid blends) when exposed to a variety of temperatures and steel grades.

The results obtained for the composition containing only HCl were used as a baseline to compare the other compositions. The results of Table 3 show that a composition according to a preferred embodiment of the present invention shows substantial improvement (more than two times better) when compared to a 15% HCl solution when exposed to coupons of 1018 steel at a temperature of 110° C. for a period of 6 hours.

Additionally, compositions according to preferred embodiments of the present invention will allow the end user to utilize an alternative to conventional acids that have the down-hole performance advantages, transportation and/or storage advantages as well as the health, safety and environmental advantages. Enhancement in corrosion control is an advantage of the present invention versus the use of HCl at temperatures above 90° C. The reduction in skin corrosiveness, the controlled spending nature, and the high salt tolerance are other advantages depending on the preferred embodiments of the compositions according to the present invention.

Dissolution Testing

In order to assess the effectiveness of the modified acid according to a preferred embodiment of the present invention, dissolution testing was carried out to study the dissolution power of various compositions upon exposure to calcium carbonate (Table 24) and dolomite (Table 25). The tests were carried out at a temperature of 23° C. and were compared to the efficacy of a solution of 15% HCl and 28% HCl. The results are reported in Tables 24 and 25 below.

TABLE 24

Dissolution results for various acid compositions and total solubility

| Fluid | Initial Weight | Final Weight | Weight Loss/g | Acid Solubility % | Total Solubility-kg/m$^3$ |
|---|---|---|---|---|---|
| HCl 15% | 20.0142 | 9.3023 | 10.7119 | 53.52 | 214 |
| HCl 15% | 25.0018 | 15.4885 | 9.5133 | 38.05 | 190 |
| HCl 28% | 20.0032 | 0.9922 | 19.011 | 95.04 | 380 |
| HCl 28% | 25.0024 | 3.84442 | 21.15798 | 84.62 | 423 |
| MEA:HCl 1:5.8 | 15.0432 | 3.5958 | 11.4474 | 76.10 | 229 |
| MEA:HCl 1:3.5 | 15.0434 | 5.9654 | 9.078 | 60.35 | 182 |
| MEA:HCl 1:3.8 | 15.0422 | 5.0306 | 10.0116 | 66.56 | 200 |
| MEA:HCl 1:4.1 | 15.0134 | 4.1962 | 10.8172 | 72.05 | 216 |
| MEA:HCl 1:4.7 | 15.0513 | 3.5523 | 11.499 | 76.40 | 230 |
| MEA:HCl 1:6.4 | 15.0328 | 1.4028 | 13.63 | 90.67 | 273 |
| MEA:HCl 1:7 | 15.00576 | 0.2064 | 14.79936 | 98.62 | 296 |
| MEA:HCl 1:9.9 | 18.5574 | 6.4458 | 18.5594 | 74.22 | 371 |
| DEA:HCl 1:3.5 | 15.0222 | 5.6072 | 9.415 | 62.67 | 188 |
| DEA:HCl 1:4.1 | 15.0356 | 4.0526 | 10.983 | 73.05 | 220 |

TABLE 25

Acid Solubility Test with Crushed Dolomite (at 23° C.) using a volume of 50 ml of composition

| Fluid | Initial | Final | Weight | Acid | Total |
|---|---|---|---|---|---|
| Example 1 | 15.032 | 5.5323 | 9.4997 | 63.20 | 190 |
| Example 2 | 20.0028 | 6.8672 | 13.1356 | 65.67 | 263 |
| Example 3 | 25.0089 | 8.8639 | 16.145 | 64.56 | 323 |
| Example 1 diluted at | 10.0318 | 5.198 | 4.8338 | 48.18 | 97 |
| Example 2 diluted at | 15.0263 | 8.4886 | 6.5377 | 43.51 | 131 |
| Example 3 diluted at | 20.0024 | 11.8339 | 8.1685 | 40.84 | 163 | be stored on location as a concentrate (providing a high level of safety even in concentrate form) that can then be deployed and diluted or blended to the desired concentration on the fly. When difficult areas of the well treatment are encountered (high breakdown pressures) the concentration can be increased, thereby reducing the time it takes to achieve the desired injection rate of the following fluid system.

Stability Testing

Testing was carried out using pressurized ageing cell with Teflon liner in order to assess the stability of the composition of Example 1 at various temperatures. The tests were conducted at a pressure of 400 psi. The results of the tests are reported in Table 26 below.

TABLE 26

Stability Test Using Pressurized Ageing Cell With Teflon Liner

| Fluid | Temp (° C.) | Pressure (psi) | Test Duration (hours) | pH before spending | pH after spending | pH after thermal treatment | Solubility before (kg/m$^3$) | Precipitation |
|---|---|---|---|---|---|---|---|---|
| Example 1 diluted to 50% | 150 | 400 | 16 | 0.2 | 2.5 | 2.2 | 110 | NO |
| Example 1 diluted to 50% | 175 | 400 | 16 | 0.15 | 2.4 | 2.3 | 110 | NO |
| Example 1 diluted to 50% | 190 | 400 | 18 | 0.17 | 2.6 | 2.5 | 110 | NO |
| Example 1 diluted to 50% | 200 | 400 | 24 | 0.08 | 2.5 | 5.2 | 110 | Slight brown organic material |

Spend Rate

Tests were conducted to assess the reactivity of the compositions according to preferred embodiment of the present invention.

Determination of Reaction Rate of Synthetic Acid at 60° C.

A predetermined amount of synthetic acid was heated to 60° C. in a water bath. The solution was then placed on a balance and a pre-weighed calcium carbonate tile was submerged in the heated solution. The weight was recorded at every 1 minute interval for 30 minutes. From the recorded weight, the weight loss percentage was calculated and plotted as a function of time.

Figure 2:
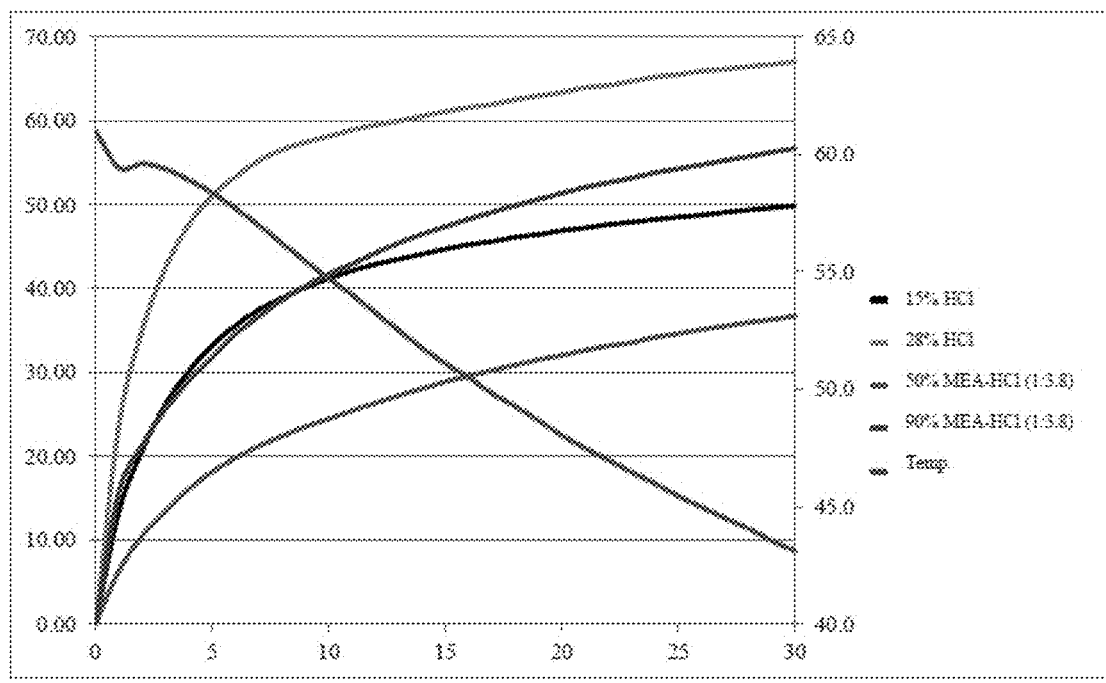
FIG. 2 is a graphical representation of the spend/reaction rate of various concentrations of another preferred embodiment according to the present invention versus two concentrations of a control composition.

Based on the data obtained, the two varying concentrations of the same composition according to a preferred embodiment of the present invention had comparable spend rates when compared to two concentrations of a control acid composition (HCl at 15% and 28%). The graphical representation of the testing is illustrated in FIGS. 1 and 2.

Although this invention exhibits a more methodical reaction rate when compared to 15% HCl, it is more reactive than most typical modified, complexed or synthetic acids at concentrations from 33% to 90%, coming very close to the reaction rate of a 15% HCl at a 90% dilution (90% acid-10% water). Having a safer modified acid system that reacts substantially faster than other safer modified acid systems is advantageous in a spearhead application where the purpose of the acid is to clean up residual cement from perforations and assist in reducing the breakdown or federate pressure during the early stages of a stimulation treatment (frac or matrix). It is advantageous to have an acid system that can Dermal Testing The objective of this study was to evaluate the dermal irritancy and corrosiveness of the composition of Example 1, following a single application to the skin of compositions of MEA-HCl of 1:4.1 molar ratio.

The test surface (human skin located on the back of the hand) was exposed to a composition of MEA-HCl of 1:4.1 molar ratio. Visual observation of the exposed areas was carried out over time intervals of 15, 30 45 and 60 minutes. The surface was washed after exposure and results were recorded as visual observations of the skin surface.

Observations recorded show that there was no blistering or redness effect on the exposed skin during and after exposure of the composition tested.

Dermal Testing (Rabbit Test)

A skin corrosion/dermal irritation study was conducted on albino rabbits using a composition of Example 1 to determine skin corrosion potential of the test material.

The original animal was treated with 0.5 mL of undiluted test material to permit predetermined observation times of treated sites for dermal irritation and defects. The first site dosed was washed and observed 3 minutes later. A second site was dosed and wrapped for 1 hour, then washed; both first and second test sites were observed. A third site dosed was wrapped for 4 hours. One hour after unwrapping and washing the third site, all three test sites were observed for signs of skin irritation and/or corrosion. Based on results of the first dosed animal, each of two additional animals were then dosed on a single intact 4-hour test site. Observations of all animals for dermal irritation and defects were made at ~1, 24, 48 and 72 hours, and (original animal only) 7, 10 and 14 days after the 4-hour dose unwrap.

Tissue destruction (necrosis) was not observed in any animals within the skin corrosion evaluation period. The test material is considered non-corrosive by DOT criteria when applied to intact skin of albino rabbits.

Dermal irritation was observed in two animals in the primary skin irritation segment of the test. A Primary Irritation Index (PII) of 1.3 was obtained based on 1, 24, 48 and 72-hour observations (4-hour exposure site only) for irritation, and that value used to assign a descriptive rating of slightly irritating.

Iron Sulfide Scale Control

A composition according to a preferred embodiment of the present invention was tested for its ability to dissolve iron sulfide. The performance results were recorded in Table 27 below.

TABLE 27

Acid Solubility Test with Iron Sulfide (at 23° C.)

| Fluid | Acid Volume (ml) | Initial Weight (g) | Final Weight (g) | Weight Loss (g) | Acid Solubility (%) | Total Solubility (kg/m$^3$) |
|---|---|---|---|---|---|---|
| Example 1 | 50 | 10.0002 | 1.5195 | 8.4807 | 84.81 | 170 |
| Example 2 | 50 | 15.0019 | 3.2539 | 11.748 | 78.31 | 235 |
| Example 3 | 50 | 15.0048 | 1.0725 | 13.9323 | 92.85 | 279 |

The above results illustrate another valuable use of a composition according to preferred embodiments of the present invention by solubilising iron sulfide a commonly encountered oil field scale.

Elastomer Compatibility

When common sealing elements used in the oil and gas industry come in contact with acid compositions they tend to degrade or at least show sign of damage. A number of sealing elements common to activities in this industry were exposed to a composition according to a preferred embodiment of the present invention to evaluate the impact of the latter on their integrity. More specifically, the hardening and drying and the loss of mechanical integrity of sealing elements can have substantial consequences on the efficiency of certain processes as breakdowns require the replacement of defective sealing elements. Testing was carried out to assess the impact of the exposure of composition of Example 1 to various elastomers. Long term (72-hour exposure) elastomer testing on the concentrated product of Example 1 at 70° C. and 28,000 kPa showed little to no degradation of various elastomers, including Nitrile® 70, Viton® 75, Alias® 80 style sealing elements, the results are reported in Table 28. This indicates that the composition of Example 1 is compatible with various elastomers typically found in the oil and gas industry.

TABLE 28

Elastomer compatibility data for 100% composition of Example 1-3 days at 70° C.

| Elastomer | Weight before/g | Weight after/g | Weight Change/g | Thickness before/mm | Thickness after/mm |
|---|---|---|---|---|---|
| Viton V75 240 | 0.3454 | 0.3556 | −0.0102 | 3.47 | 3.55 |
| Nitrile N70 240 | 0.2353 | 0.2437 | −0.0084 | 3.53 | 3.5 |
| EPDM E70 126 | 0.114 | 0.1195 | −0.0055 | 2.58 | 2.65 |

Wormholing Testing

Numerous studies of the wormholing process in carbonate acidizing have shown that the dissolution pattern created by the flowing acid can be characterized as one of three types (1) compact dissolution, in which most of the acid is spent near the rock face; (2) wormholing, in which the dissolution advances more rapidly at the tips of a small number of highly conductive micro-channels, i.e. wormholes, than at the surrounding walls; and (3) uniform dissolution.

The dissolution pattern that is created depends on the interstitial velocity, which is defined as the acid velocity flowing through the porous medium. Interstitial velocity is related to the injection rate (interstitial velocity=injection rate/(area of low porosity). Compact dissolution patterns are created at relatively low injection rates, wormhole patterns are created at intermediate rates and uniform dissolution patterns at high rates.

This interstitial velocity at the wormhole tip controls the wormhole propagation. The optimal acid injection rate is then calculated based on a semi-empirical flow correlation. At optimal injection rate, for a given volume, acid penetrates the furthest into the formation, resulting in the most efficient outcome of the acid stimulation. Wormhole structures change from large-diameter at low interstitial velocity to thin wormholes at optimal velocity conditions, to more branched patterns at high interstitial velocity.

Figure 3:
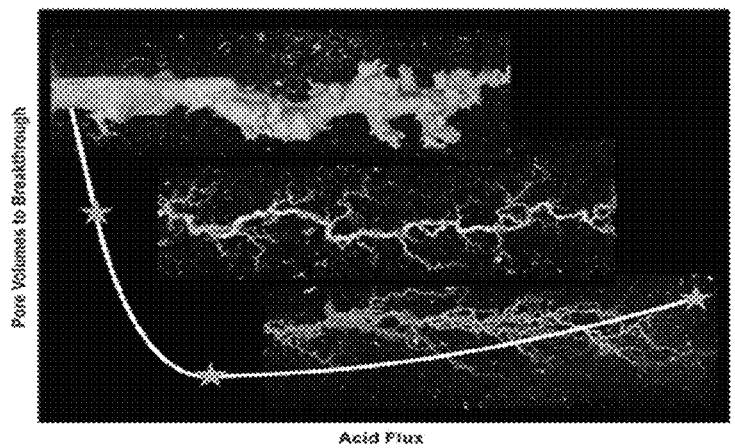
FIG. 3 is a CT scan of various wormholes obtained as a function of the injection of acid (acid flux) into a formation.

It has been well-accepted by the industry that the interstitial velocity yielding wormhole mode if the optimal interstitial velocity, at which for a given volume acid penetrates the furthest into the formation, resulting in the most efficient outcome of acid stimulation. Wormhole structures change from large-diameter at low interstitial velocity to thin wormholes at optimal condition, to more branched pattern at high interstitial velocity. FIG. 3 shows an example illustrating three wormhole patterns.

This series of experimental testing study examined the composition of Example 1 (diluted to a 90% concentration). This composition is designed as a low-hazard/low-corrosion aqueous synthetic acid enhanced through the addition of proprietary oilfield chemistry to replace standard HCl blends, especially for high to ultra-high temperature.

The acid system according to the present invention was compared to 15% HCl under the exact same testing conditions. The wormhole efficiency curve (pore volume to breakthrough vs interstitial velocity) was determined for both acid systems for comparison. It was concluded that the composition tested has the similar optimal pore volume of breakthrough at about 11% lower value and about 18% lower of optimal interstitial velocity compared with HCl.

Test Parameters

Two series of matrix acidizing experiments were conducted in order to evaluate the performance of the composition of Example 1 vs 15% HCl. The experiments utilized a 90% concentration of the composition of Example 1 comprising 0.3 vol % common commercial corrosion inhibitor, and the other set of experiments utilized a 15% solution of HCl with 0.3 vol % of a corrosion inhibitor. The experiments were conducted utilizing Indiana limestone cores.

All cores were 1.5-inch in diameter and 8-inch in length. The average porosity of the core samples was 14% and the average permeability was 13 mD. The back pressure used in these experiments was 2000 psi. The testing temperature was 180° F. (82° C.). The limestone cores were selected as they help in simulating the geology encountered most commonly in oilfields in North America.

Test Procedure

The matrix acidizing apparatus consists of a pumping system, an accumulation system, a core containment cell, a pressure maintaining system, a heating system and a data acquisition system. A Teledyne Isco® syringe pump was used to inject water and acid at constant rates. A back-pressure regulator was used to maintain the desired minimum system pressure at 2000 psi.

Confining pressure was set to 400-500 psi higher than the injection pressure to avoid fluid leaking. Two heating tapes were used to heat the core holder and the injection fluid for the high-temperature tests. During the experiment, the system was first pressurized by injecting water, once the flow reached a steady state; permeability was calculated from the measured pressure differential across the core containment cell. The system was then heated to the experiment temperature. When the full system; fluid, core containment cell and core reached the target temperature, water injection was ceased and acid injection commenced.

Injection was ceased when wormholes breached the core and acid injection time was recorded for the breakthrough pore volume calculation. For each experimental condition, 4-6 individual tests were performed with the same temperature and pressure parameters. The only condition that changed was the injection rate. The rate varied in a range until the optimal condition was identified. The Buijse and Glasbergen (2005) model was utilized to generate the wormhole efficiency relationship by fitting the experimental data obtained.

Core Properties

The cores utilized for testing were 1.5 inches in diameter and 8 inches long. Indiana limestone samples were obtained from one sample of outcrop to ensure linear properties.

Experimental Results

The experimental results for HCl are listed in Table 29 below. The experimental results for the composition of Example 1 (at 90% concentration) are listed in Table 30.

TABLE 29

Wormholing Experiment - Experimental Results for HCl

| Core# | Acid injection rate (ml/min) | Interstitial Velocity (cm/min) | Pore Volume to Breakthrough |
|---|---|---|---|
| IC2 | 10 | 6.39 | 0.52 |
| IC1 | 8 | 4.53 | 0.60 |
| IC3 | 7 | 4.97 | 0.60 |
| IC5 | 5 | 3.47 | 0.51 |
| IC6 | 3 | 2.10 | 0.47 |
| IC16 | 2 | 1.56 | 0.64 |
| IC18 | 0.8 | 0.62 | 2.93 |

TABLE 30

Wormholing Experiment - Experimental Results for the composition of Example 1 (at 90% concentration)

| Core# | Acid injection rate (ml/min) | Interstitial Velocity (cm/min) | Pore Volume to Breakthrough |
|---|---|---|---|
| IC111 | 10 | 6.37 | 0.63 |
| IC108 | 5 | 3.01 | 0.46 |
| IC112 | 3 | 1.92 | 0.49 |
| IC5109 | 2 | 1.2 | 0.57 |
| ICA16 | 1 | 0.57 | 2.11 |

The optimal condition for two sets of experiments with Buijse and Glasbergen equation are listed in Table 31.

Figure 4:
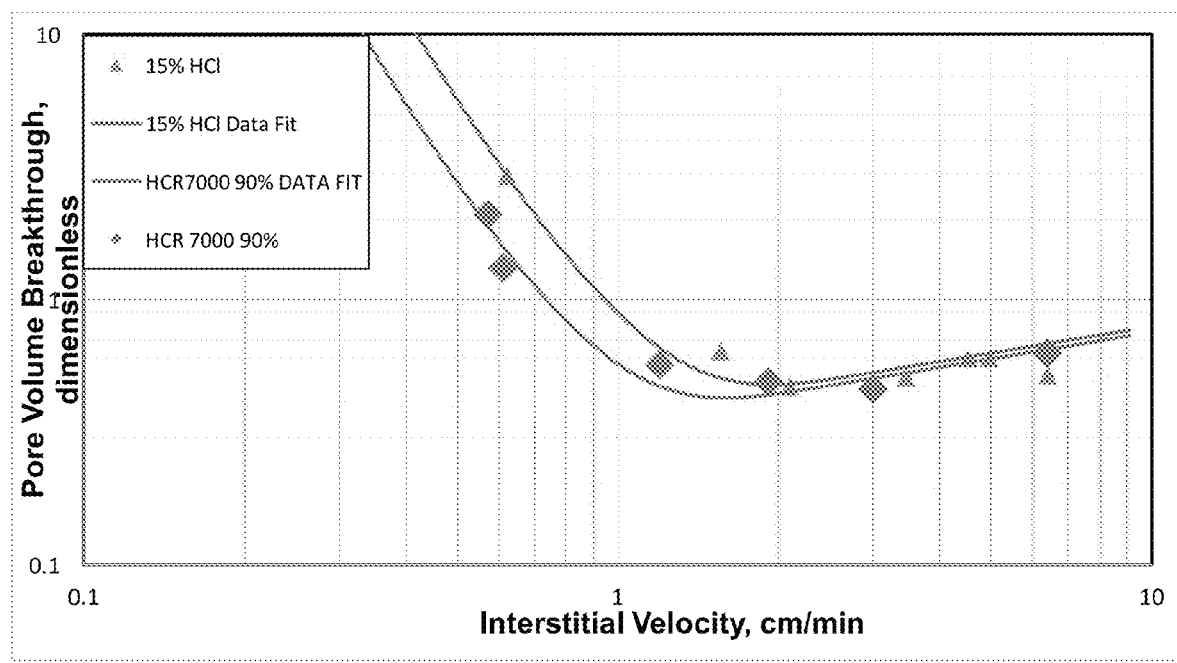
FIG. 4 is a graphical representation of the results of the wormhole efficiency relationship testing using a composition according to a preferred embodiment of the present invention.

FIG. 4 is a graphical representation of the results of the wormhole efficiency relationship testing using a composition according to a preferred embodiment of the present invention. The data obtained and plotted correlates the Pore volume breakthrough as a function of the interstitial velocity. The lowest point of each curve is considered to provide the optimal condition for each acidic composition.

Figure 5A:
FIGS. 5A, 5B, 5C, 5D and 5E are images of the wormholes obtained during the wormhole efficiency relationship testing using a composition according to a preferred embodiment of the present invention.
Figure 5B:
Figure 5C:
Figure 5D:
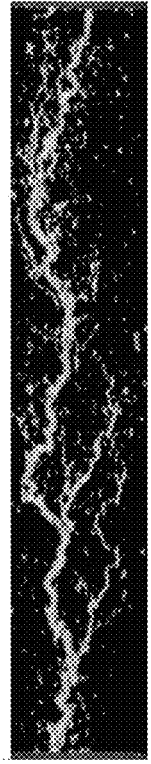
Figure 5E:

The CT scans for both the compositions of Example 1 (at 90% concentration) are shown in FIGS. 5A, B, C, D and E. The CT scan images for core LDA16 (FIG. 5A), IC108 (FIG. 5D), IC109 (FIG. 5B), IC111 (FIG. 5E) and IC112 (FIG. 5C). The images are arranged from the lowest interstitial velocity (0.57 cm/min) to highest interstitial velocity (6.37 cm/min). The wormholing behavior follows the conventional pattern: at low interstitial velocity, the wormholes are more branched and at high interstitial velocity, the wormholes are more uniform and straight.

TABLE 31

Optimal Condition Obtained from Experimental Results from Wormholing Experiment #1
Optimal condition

| | HCl | Example 1 (90% conc.) |
|---|---|---|
| $PV_{bt\text{-}optimal}$ | 0.46 | 0.41 |
| $V_{i\text{-}opt}$ | 1.97 | 1.62 |
| $PV_{bt\text{-}optimal}$ difference | | 11% |
| $V_{i\text{-}optimal}$ difference | | 18% |

According to the optimal wormhole efficiency theory, wormhole diameter is supposed to increase when the injection velocity decreases and the stimulation begins losing efficiency at low injection rates. This is not observed during this study utilizing the composition of Example 1 (at 90% concentration). At a low injection rate (0.8 ml/min (0.5 cm/min)) the HCl core developed a large-diameter wormhole and the wormhole propagation velocity is slow. The test stopped because the sleeve for confining pressure was broken by compact dissolution exhibited with HCl. On the contrast, the composition of Example 1 (at 90% concentration) showed a wormhole diameter similar to the more optimal injection rate (higher injection rate). At 1.2 cm/min, the wormholes created by the composition of Example 1 (at 90% concentration) were much smaller (desired) than the ones created by the 15% HCl composition. This shows that the composition of Example 1 (at 90% concentration) according a preferred embodiment of the present invention has higher stimulation efficiency in general compared with HCl, especially at lower injection rate.

Preliminary observations of wormhole efficiency tests: the optimal interstitial velocity for the composition of Example 1 (at 90% concentration) is lower than 15% HCl, providing an advantage over HCl acid system test. This feature helps to reduce the requirements of high injection rates typically utilized in field operations to achieve any level of efficiency with regards to wormholing performance; the optimal pore volume to breakthrough for the composition of Example 1 (at 90% concentration) is similar (optimal) to 15% HCl. With other retarded acids, they tend to have lower optimal interstitial velocity. Most of them, if not all, have higher optimal pore volume of breakthrough because of lower reaction rates. The composition of Example 1 (at 90% concentration) does not exhibit an increased $PV_{bt,opt}$; and it has advantageous potential when compared to 15% HCl from a wormhole performance perspective. The benefit is more pronounced at low interstitial velocity. For injection-rate limited applications, the composition according to the present invention may reduce the acid volume required 2-4 times with the same stimulation outcome.

Wormholing Performance

In order to compare the wormholing performance of the composition of Example 1 (at 90% conc.) and a 15% HCl composition, some modeling work was done at two interstitial velocity values.

To compare their performance, $v_i$ near Example 1's optimal condition and at a lower condition were modeled. Table 32 contains the corresponding $PV_{bt}$ values at selected $v_i$.

TABLE 32

Modeling Conditions for the composition of Example 1 (90% conc.) and 15% HCl
Modeling Conditions

|  |  | HCl | Example 1 (90% conc.) |
|---|---|---|---|
| Case 1 | $V_{i,1}$ | 1.6 | 1.6 |
|  | $PV_{bt,1}$ | 0.49 | 0.41 |
| Case 2 | $V_{i,2}$ | 0.6 | 0.6 |
|  | $PV_{bt,2}$ | 3.23 | 2.11 |

Modeling work followed Buijse-Glasbergen model of wormhole propagation. The equation is as following:

$$v_{wh} = \left(\frac{v_i}{PV_{bt,n}}\right) \times \left(\frac{v_i}{v_{i,n}}\right)^{-\gamma} \times \left\{1 - \exp\left[-4\left(\frac{v_i}{v_{i,n}}\right)^2\right]\right\}^2 \quad (1)$$

For each of the cases, the $PV_{bt,n}$ and $v_{i,n}$ values were varied to assess the acid performance by comparing the $v_{wh}$ values. The wormhole length at each time step was calculated by simply computing how much wormhole has increased by multiplying the wormhole tip velocity to the time step (in this case 0.1 min) and adding to the wormhole length at previous time step.

$$r_{wh} = r_{wi} + v_{wh} * 0.1 \quad (2)$$

Skin was calculated with simplified Hawkins' formula.

$$s = -\ln\left(\frac{r_{wh}}{r_w}\right) \quad (3)$$

The overall productivity index was calculated with formula 4 below:

$$J_D = \frac{1}{\ln\left(\frac{r_e}{r_w}\right) + s} \quad (4)$$

Then the productivity of each acid was compared with the JD values at overall skin of 0 and 10.

$$\frac{J_D}{J_{D_s}} = \frac{\ln\left(\frac{r_e}{r_w}\right)}{\ln\left(\frac{r_e}{r_w}\right) + s} \quad (5)$$

where the skin term will have the value of either 0 or 10. Then this ratio was graphed with the volume of acid used. For the sake of the calculation, injection rate of 2 bpm, porosity of 14%, wellbore thickness of 1,000 ft, initial wellbore radius of 0.4 ft, reservoir radius of 2,980 ft, wellbore pressure of 3,000 psi, reservoir pressure of 5,000 psi, permeability of 30 mD, fluid viscosity of 1 cp, and formation volume factor of 1.117 were assumed.

Figure 6:
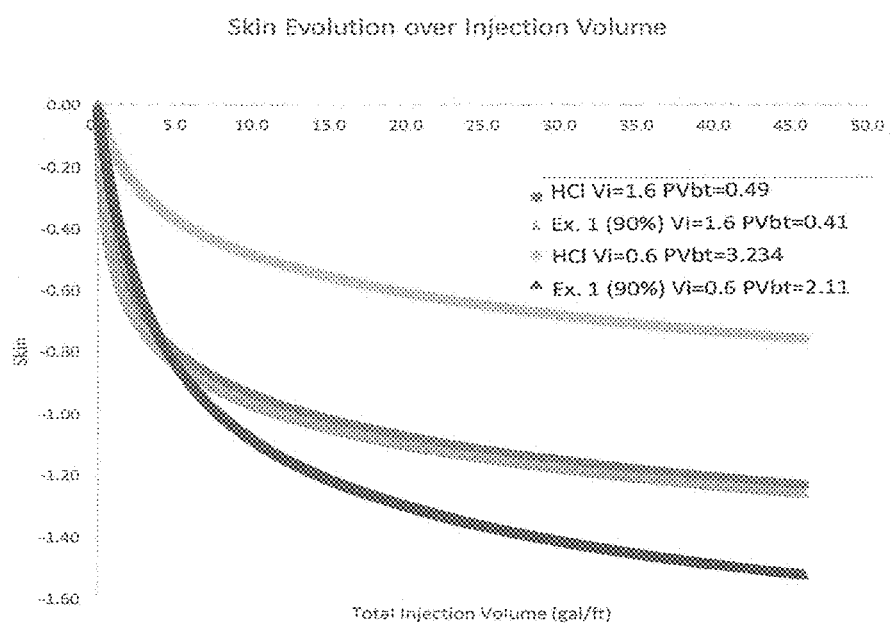
FIG. 6 is a graphical representation of the skin evolution over injection volume for HCl (15%) and the composition of Example 1 (90% conc.)
Figure 7:
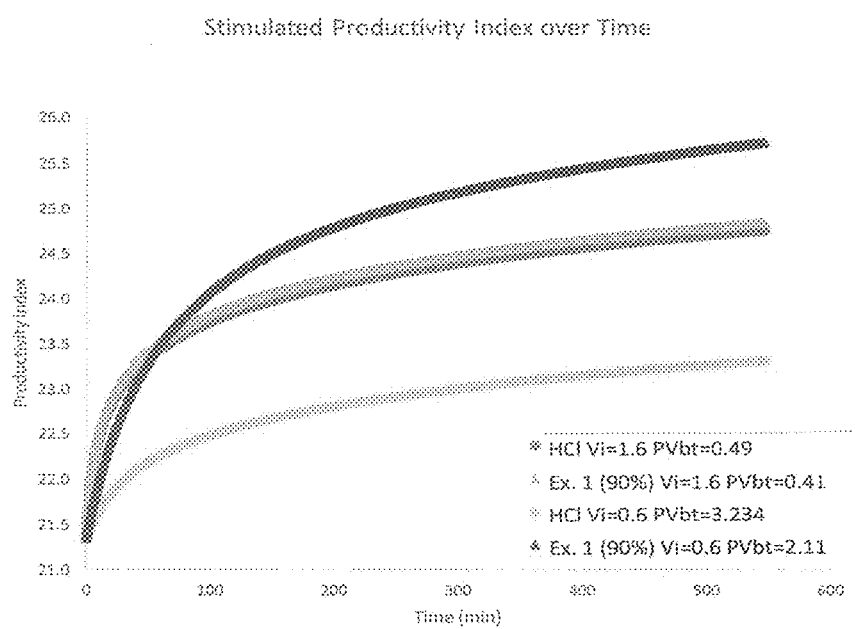
FIG. 7 is a graphical representation of the stimulated productivity index over time for HCl (15%) and the composition of Example 1 (90% conc.)
Figure 8:
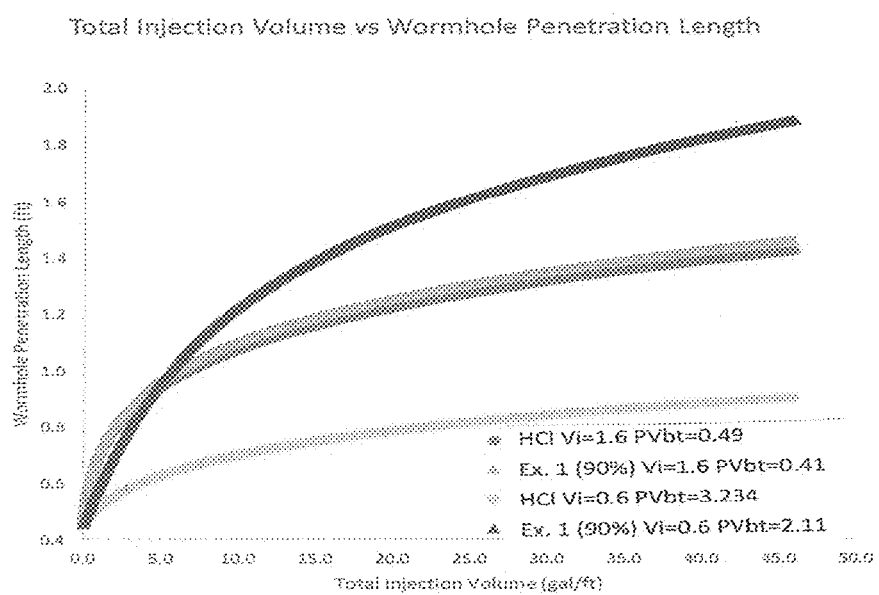
FIG. 8 is a graphical representation of the wormhole penetration length over total injection volume for HCl (15%) and the composition of Example 1 (90% conc.)
Figure 9:
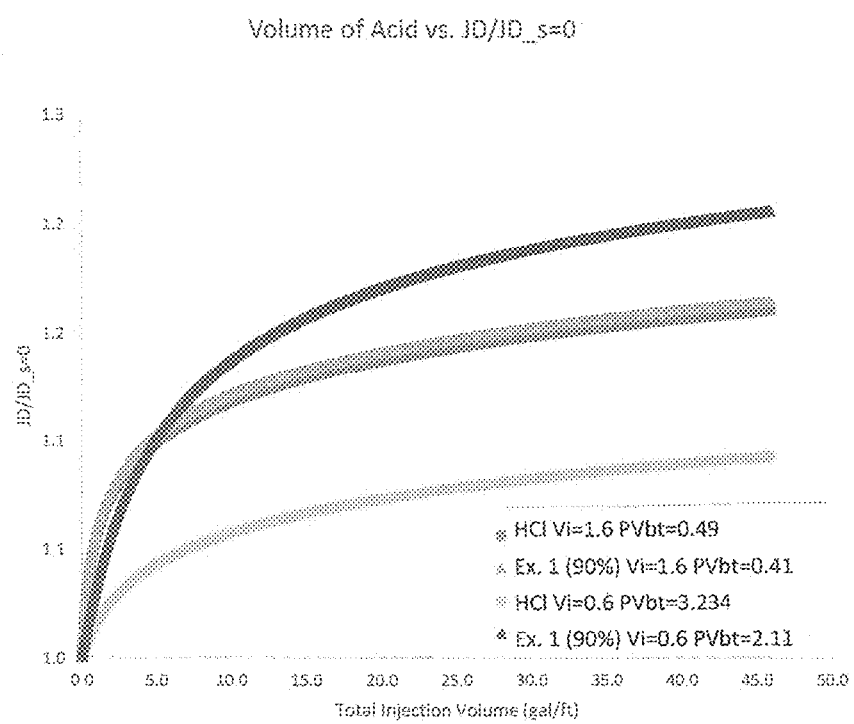
FIG. 9 is a graphical representation of the productivity index comparison at 0 skin for HCl (15%) and the composition of Example 1 (90% conc.)
Figure 10:
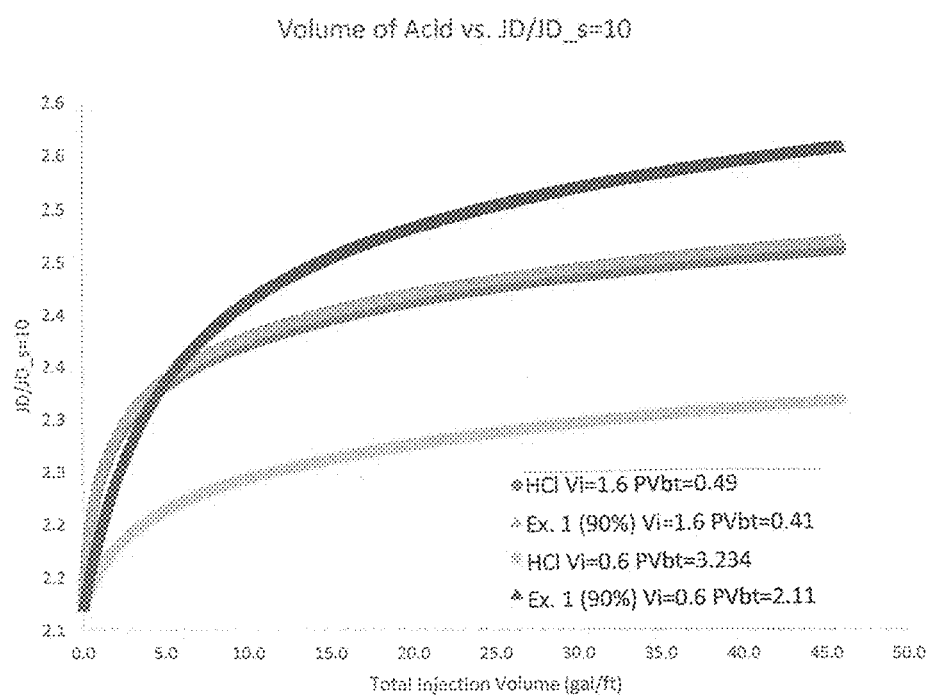
FIG. 10 is a graphical representation of the productivity index comparison at 10 skins for HCl (15%) and the composition of Example 1 (90% conc.).

FIGS. 6 to 10 are the graphs generated with these conditions. The four curves represent the performance of both compositions at two different interstitial velocities (the HCl composition (15%) and the composition of Example 1 (at 90% conc.) both at 0.6 and 1.6 cm/min). FIG. 6 is a graphical representation of the skin evolution over injection volume for HCl (15%) and the composition of Example 1 (90% conc.). FIG. 7 is a graphical representation of the stimulated productivity index over time for HCl (15%) and the composition of Example 1 (90% conc.). FIG. 8 is a graphical representation of the wormhole penetration length over total injection volume for HCl (15%) and the composition of Example 1 (90% conc.). FIG. 9 is a graphical representation of the productivity index comparison at 0 skin for HCl (15%) and the composition of Example 1 (90% conc.). FIG. 10 is a graphical representation of the productivity index comparison at 10 skins for HCl (15%) and the composition of Example 1 (90% conc.).

As can be seen from the FIGS. 6 to 10, the composition of Example 1 (at 90% concentration) shows a clear superior performance at low interstitial velocity in comparison to a 15% HCl composition. This means that if the acid stimulation operation has a limitation for pumping rate below 15% HCl's optimum interstitial velocity, the composition of example 1 (at 90% conc.) has definite advantage compared to 15% HCl.

Environmental Testing

A series of test were carried out to assess the environmental impact of monoethanoamine. A stock solution of 98-99% pure monoethanolamine was sent to be tested. The solution was diluted where necessary.

Determination of Acute Lethal Toxicity to Marine Copepods (*Copepoda; Crustacea*) (ISO 14669 (1999) Water Quality)

This study was commissioned to determine the aquatic phase toxicity of monoethanolamine to the marine copepod *Acartia tonsa*. The *A. tonsa* toxicity $LC_{50}$ test was conducted in accordance with the study plan except for the following deviation and interferences but met all other relevant validity criteria. In the definitive test the temperature of the dilution water was below acceptable limits by a maximum of 0.7° C., the pH was below acceptable limits by a maximum of 0.01 units. These deviations were not expected to have an impact on the test as there was no control mortalities.

In the range-finding test composition of monoethanolamine exhibited a 48 h $LC_{50}$ value of 550 mg/l (Water Accommodated Fraction (WAF)) to the marine copepod *A. tonsa* in the aqueous phase. The result was based on nominal concentrations and was calculated by Linear Interpolation within the CETIS suite of statistical analysis. There was <10% control mortality observed throughout the range-finding test. In the definitive test, the composition of monoethanolamine exhibited a 48 h $LC_{50}$ value of 434 mg/l in seawater (Water Accommodated Fraction (WAF)) to the marine copepod *A. tonsa* in the aqueous phase. The result was based on nominal concentrations and was calculated by Linear Interpolation within the CETIS suite of statistical analysis. There were <10% control mortality observed throughout the definitive test.

OSPARCOM Guidelines (2006) Part A. A Sediment Bioassay Using an Amphipod *Corophium* Sp.

This study was commissioned to determine the sediment phase toxicity of the composition of monoethanolamine to the intertidal amphipod *Corophium volutator*. The *C. volutator* toxicity $LC_{50}$ test was conducted in accordance with the study plan and met all relevant validity criteria. The pH at the 10,000 mg/kg (nominal weight) replicates showed a much higher pH compared to the normal required range of 7.5-8.5, this is a direct effect of the test material itself. The composition of monoethanolamine exhibited a 10 day $LC_{50}$ value of 6,660 mg/kg (via dried sediment) to the marine amphipod C. volutator in the sediment phase. The result is based on nominal concentrations and was calculated by Linear Interpolation within the CETIS suite of statistical analysis.

ISO 10253 (2016) Water Quality—Marine Algal Growth Inhibition Test with Skeletonema sp.

This study was commissioned to determine the aquatic phase toxicity of the composition of monoethanolamine to the marine unicellular algae Skeletonema sp. The Skeletonema sp. toxicity $EC(r)_{50}$ test was conducted in accordance with the study plan and met all relevant validity criteria. It is the results from this test that has been reported. Observations showed that the pH for a 1000 mg/l stock resulted in a physical change, the stock went from cloudy to clear therefore the unadjusted stocks were used for the range-finding test and definitive test apart from the 100 mg/l stock, there was no physical change observed.

In the range-finding test, the composition of monoethanolamine exhibited a 72 h $EC(r)_{50}$ value of 509 mg/l (WAFs) to the marine phytoplankton Skeletonema sp. in the aqueous phase. The result is based on nominal concentrations and was calculated by Linear Interpolation within the CETIS suite of statistical analysis. In the definitive test, monoethanolamine exhibited a 72 h $EC(r)_{50}$ value of 199.7 mg/l (WAFs) to the marine phytoplankton Skeletonema sp. in the aqueous phase. The result is based on nominal concentrations and was calculated by Linear Interpolation within the CETIS suite of statistical analysis.

Assessment of Aerobic Degradability of the Composition of Example 1 in Seawater (OECD 306 Method)

This study was commissioned to determine the aerobic degradability of the composition of monoethanolamine in seawater. The test was conducted in accordance with the study plan and met all relevant validity criteria. There were no deviations in this test. The $ThOD_{NO3}$ value was determined from the chemical formula of the compound tested. There were nitrogen containing components present, therefore full nitrification was assumed.

The oxygen blank degradation was within formal limits of acceptability. The soluble reference material, sodium benzoate, degraded by more than 60% in the first 14 days, indicating that the seawater used in the test contained a satisfactory population of viable bacteria. The seawater data collected confirms the microbial count for seawater used in this test was within acceptable limits.

According to the biodegradation data with nitrification taken into account the composition of monoethanolamine biodegraded by 71% over 28 days. The test material appeared to biodegrade rapidly during the first 7 days, the rate slowed down between days 14 and 21. However, during the last 7 days the rate increased to reach a maximum biodegradation of 71% on the final day of the 28-day study.

The OECD 306 guideline states the test material can be considered to be inhibitory to bacteria (at the concentration used) if the BOD of the mixture of reference and test materials is less than the sum of the BOD of the separate solutions of the two substances. Within this test, the composition showed a low percentage inhibition of 12% in 28 days.

Assessment of the Toxicity of the Composition of Example 1 to the Marine Fish Cyprinodon variegatus (OSPAR Limit Test)

This study was commissioned to determine the aquatic (96 h limit test) toxicity of the composition of monoethanolamine to the marine fish Cyprinodon variegatus.

The 96 h fish limit test was conducted in accordance with the study plan and met all relevant validity criteria. There were no interferences in this test. Test conditions of exposure were within formal and informal limits of acceptability except for the exception noted below. There were ten fish used in both the test and control tanks, with no control mortality observed. The pH was not adjusted as the adjustment of pH caused a physical change in the test material stock in an allied study; the assessment of the toxicity (48 h $LC_{50}$) of the composition tested to the marine copepod Acartia tonsa (2356-1).

The test concentration was derived from the test material $EC/LC_{50}$ value between the most sensitive acute toxicity test species Skeletonema sp. and A. tonsa. From allied studies, the algal species Skeletonema sp. was noted to be more sensitive with an $EC_{50}$ value of 199.7 mg/l.

After 96 h exposure to the composition of monoethanolamine, no mortalities were observed in the marine fish C. variegatus. Therefore, it can be concluded that the composition exhibited no effect at 199.7 mg/l after 96 h of exposure (Water Accommodated Fraction) to the marine fish C. variegatus in the water phase.

Uses of Compositions According to Preferred Embodiments of the Present Invention Table 33 lists a number of potential uses (or applications) of the compositions according to the present invention upon dilution thereof ranging from approximately 1 to 90% dilution, include, but are not limited to: injection/disposal treatments; matrix acid squeezes, soaks or bullheads; acid fracturing, acid washes; fracturing spearheads (breakdowns); pipeline scale treatments, cement breakdowns or perforation cleaning; pH control; and de-scaling applications, high temperature (up to 190° C.) cyclical steam scale treatments and steam assisted gravity drainage (SAGD) scale treatments (up to 190° C.).

The methods of use generally comprise the following steps: providing a composition according to a preferred embodiment of the present; exposing a surface (such as a metal surface) to the aqueous modified acid composition; allowing the aqueous modified acid composition a sufficient period of time to act upon said surface; and optionally, removing the acid composition when the exposure time has been determined to be sufficient for the operation to be complete or sufficiently complete. Another method of use comprises: injecting the aqueous modified acid composition into a well and allowing sufficient time for the aqueous modified acid composition to perform its desired function, subsequently removing the acid composition from the well to stop the acid exposure. Yet another method of use comprises: exposing the aqueous modified acid composition to a body of fluid (typically water) requiring a decrease in the pH and allowing sufficient exposure time for the aqueous modified acid composition to lower the pH to the desired level.

TABLE 33

Applications for which compositions according to the present invention can be used as well as proposed dilution ranges

| Application | Suggested | Benefits |
|---|---|---|
| Injection/Disposal | 10%-75% | Compatible with mutual solvents and solvent blends, |
| Squeezes & Soaks | 33%-75% | Ease of storage & handling, cost effective compared |
| Bullhead | | to conventional acid stimulations. Ability to leave |
| Annular | | pump equipment in wellbore. |
| Acid Fracs/matrix treatments | 50%-90% | Decreased shipping and storage compared to conventional acid, no blend separation issues, comprehensive spend rate encourages deeper formation penetration. |
| Frac Spearheads (Break-downs) | 33%-90% | Able to adjust concentrations on the fly. Decreased shipping and storage on location. |
| Cement Break-downs | 20%-90% | Higher concentrations recommended due to lower temperatures, and reduced solubility of aged cement. |
| pH Control | 0.1%-1.0% | Used in a variety of applications to adjust pH level of water based systems. |
| Liner De-Scaling, Heavy Oil | 1%-25% | Continuous injection/de-scaling of slotted liners, typically at very high temperatures. |

The main advantages of the use of the modified acid composition included: the reduction of the total loads of acid being transported, and the required number of tanks by delivering concentrated product to location and diluting with fluids available on location, or near location (with fresh or low to high salinity production water). Another advantage of a preferred embodiment of the present invention includes the decreased the load of corrosion inhibitor. Other advantages of preferred embodiments of the composition according to the present invention include: operational efficiencies which lead to the elimination of having to periodically circulate tanks of HCl acid due to corrosion control chemical additive separation; reduced corrosion to downhole tubulars; temperature corrosion protection up to 190° C., less facility disruptions due to iron or metals precipitation in the oil treating process and precipitation of solubilized carbonate at lower pH levels, thermal stability of a modified acid, and reduced hazardous HCl acid exposure to personnel and environment by having a low hazard, low fuming acid (lower vapour pressure) having low or no dermal corrosiveness.

A modified acid composition according to a preferred embodiment of the present invention, can be used to treat scale formation in SAGD or CSS (cyclical stream) operations at high temperatures (up to 190° C.) while achieving time dependent acceptable corrosion limits set by industry (typically two to three hours at elevated temperatures). This also eliminates the need for the SAGD or CSS operations to be halted for a "cool down prior to a scale treatment and said modified acid is injected into said well to treat scale formation inside said well at high temperatures greatly reducing down-time and lost revenue for the operator.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method of use of a modified acid composition comprising:
providing an aqueous modified acid composition comprising a mineral acid and an alkanolamine in a molar ratio ranging from 3:1 to not more than 15:1 and having a pH of less than 1;
contacting a surface of the aqueous modified acid composition;
allowing the aqueous modified acid composition to act upon said surface;
removing the acid composition when an exposure time has been determined to be sufficient for the operation to be complete or sufficiently complete; and
wherein said method of use includes at least one of etching concrete or cleaning concrete from equipment and buildings.

2. The method according to claim 1, wherein the mineral acid is selected from the group consisting of: HCl, nitric acid, sulfuric acid, sulfonic acid, phosphoric acid, and combinations thereof.

3. The method according to claim 1, wherein the mineral acid is hydrochloric acid.

4. The method according to claim 1, wherein the hydrochloric acid and alkanolamine are present in a molar ratio of not more than 10:1.

5. The method according to claim 1, wherein the hydrochloric acid and alkanolamine are present in a molar ratio of not more than 7.0:1.

6. The method according to claim 1, wherein the hydrochloric acid and alkanolamine are present in a molar ratio of not more than 4.1:1.

7. The method according to claim 1, wherein the alkanolamine is selected from the group consisting of: monoethanolamine; diethanolamine; triethanolamine and combinations thereof.

8. The method according to claim 1, wherein the alkanolamine is monoethanolamine.

9. The method according to claim 1, wherein the alkanolamine is diethanolamine.

10. The method according to claim 1, wherein the modified acid composition further comprises a corrosion inhibitor comprising a $\alpha,\beta$-unsaturated aldehyde with no methyl group at the alpha position.

11. A method of use of a modified acid composition comprising:
providing an aqueous modified acid composition comprising a mineral acid and an alkanolamine in a molar ratio ranging from 3:1 to not more than 15:1 and having a pH of less than 1;

contacting a surface of the aqueous modified acid composition;
  allowing the aqueous modified acid composition to act upon said surface;
  removing the acid composition when an exposure time has been determined to be sufficient for the operation to be complete or sufficiently complete; and
  wherein said method of use includes at least one of descaling pipelines and related equipment or descaling facilities.

12. The method according to claim 11, wherein the mineral acid is selected from the group consisting of: HCl, nitric acid, sulfuric acid, sulfonic acid, phosphoric acid, and combinations thereof.

13. The method according to claim 11, wherein the mineral acid is hydrochloric acid.

14. The method according to claim 11, wherein the hydrochloric acid and alkanolamine are present in a molar ratio of not more than 10:1.

15. The method according to claim 11, wherein the hydrochloric acid and alkanolamine are present in a molar ratio of not more than 7.0:1.

16. The method according to claim 11, wherein the hydrochloric acid and alkanolamine are present in a molar ratio of not more than 4.1:1.

17. The method according to claim 11, wherein the alkanolamine is selected from the group consisting of: monoethanolamine; diethanolamine; triethanolamine and combinations thereof.

18. The method according to claim 11, wherein the alkanolamine is monoethanolamine.

19. The method according to claim 11, wherein the alkanolamine is diethanolamine.

20. The method according to claim 11, wherein the modified acid composition further comprises a corrosion inhibitor comprising a $\alpha$, $\beta$-unsaturated aldehyde with no methyl group at the alpha position.

* * * * *